United States Patent
Liu et al.

(10) Patent No.: US 11,140,412 B2
(45) Date of Patent: Oct. 5, 2021

(54) MOTION CANDIDATE LIST CONSTRUCTION FOR INTRA BLOCK COPY (IBC) MODE AND NON-IBC INTER MODE

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/330,889

(22) Filed: May 26, 2021

(65) Prior Publication Data

US 2021/0281877 A1 Sep. 9, 2021

Related U.S. Application Data

(63) Continuation of application No. PCT/CN2020/075496, filed on Feb. 17, 2020.

(30) Foreign Application Priority Data

Feb. 17, 2019 (WO) ................ PCT/CN2019/075302

(51) Int. Cl.
*H04N 19/52* (2014.01)
*H04N 19/56* (2014.01)
(Continued)

(52) U.S. Cl.
CPC ........... *H04N 19/56* (2014.11); *H04N 19/176* (2014.11); *H04N 19/184* (2014.11); *H04N 19/52* (2014.11); *H04N 19/593* (2014.11)

(58) Field of Classification Search
CPC ...... H04N 19/56; H04N 19/52; H04N 19/176; H04N 19/184; H04N 19/593
See application file for complete search history.

(56) References Cited

U.S. PATENT DOCUMENTS 9,860,559 B2   1/2018 Zhang et al.
9,877,043 B2   1/2018 He et al.
(Continued)

FOREIGN PATENT DOCUMENTS

CN   103797799 A   5/2014
CN   103843347 A   6/2014
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Anner N Holder
(74) *Attorney, Agent, or Firm* — Perkins Coie LLP

(57) ABSTRACT

A method for video processing is provided to include constructing, during a conversion between a current video block and a coded representation of the current video block, an intra block copy (IBC) motion candidate list, wherein insertion of motion candidates to the IBC motion candidate list is subject to a size restriction; and performing the conversion using the IBC motion candidate list.

20 Claims, 24 Drawing Sheets

(51) Int. Cl.
*H04N 19/176* (2014.01)
*H04N 19/184* (2014.01)
*H04N 19/593* (2014.01)

(56) References Cited

U.S. PATENT DOCUMENTS

| | | | |
|---|---|---|---|
| 10,178,403 B2 | 1/2019 | Seregin et al. | |
| 10,284,874 B2 | 5/2019 | He et al. | |
| 10,412,387 B2 | 9/2019 | Pang et al. | |
| 10,516,882 B2 | 12/2019 | He et al. | |
| 10,582,213 B2 | 3/2020 | Li et al. | |
| 2015/0103910 A1 | 4/2015 | Kwon et al. | |
| 2015/0264386 A1* | 9/2015 | Pang | H04N 19/52 375/240.16 |
| 2015/0373359 A1 | 12/2015 | He et al. | |
| 2016/0057420 A1* | 2/2016 | Pang | H04N 19/513 375/240.16 |
| 2016/0255344 A1 | 9/2016 | Lee et al. | |
| 2017/0099495 A1* | 4/2017 | Rapaka | H04N 19/46 |
| 2017/0118484 A1* | 4/2017 | Maeda | H04N 19/176 |
| 2017/0280159 A1* | 9/2017 | Xu | H04N 19/52 |
| 2017/0289566 A1 | 10/2017 | He et al. | |
| 2018/0131963 A1 | 5/2018 | Chuang et al. | |
| 2019/0200038 A1 | 6/2019 | He et al. | |
| 2019/0246143 A1 | 8/2019 | Zhang et al. | |
| 2020/0036997 A1* | 1/2020 | Li | H04N 19/521 |
| 2020/0077087 A1 | 3/2020 | He et al. | |
| 2020/0396465 A1 | 12/2020 | Zhang et al. | |
| 2020/0404255 A1 | 12/2020 | Zhang et al. | |
| 2020/0404260 A1 | 12/2020 | Zhang et al. | |
| 2020/0413048 A1 | 12/2020 | Zhang et al. | |

FOREIGN PATENT DOCUMENTS

| | | | |
|---|---|---|---|
| CN | 103931196 A | 7/2014 | |
| CN | 104221380 A | 12/2014 | |
| CN | 105493505 A | 4/2016 | |
| CN | 106105212 A | 11/2016 | |
| CN | 106416245 A | 2/2017 | |
| CN | 106489267 A | 3/2017 | |
| CN | 106576171 A | 4/2017 | |
| CN | 107005696 A | 8/2017 | |
| CN | 107079161 A | 8/2017 | |
| CN | 107852499 A | 3/2018 | |
| CN | 108141604 A | 6/2018 | |
| CN | 108141605 A | 6/2018 | |
| WO | 2015052273 A1 | 4/2015 | |
| WO | 2015106121 A1 | 7/2015 | |
| WO | 2018097607 A1 | 5/2018 | |
| WO | WO-2020047807 A1 * | 3/2020 | ........... H04N 19/139 |

OTHER PUBLICATIONS

"High Efficiency Video Coding" Series H: Audiovisual and Multimedia Systems: Infrastructure of Audiovisual Services—Coding of Moving Video, ITU-T, H.265, 2018.

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Xu et al. "CE8: Summary Report on Screen Content Coding," Joint Video Experts Team (JVET) of ITU-T SG 16 WP3 and ISO/IEC JTC 1/SC 29/WG 11 13th Meeting, Marrakesh, MA, Jan. 9-18, 2019, document JVET-M0028, 2019.

Xu et al. "CE2/4-Related: Unified Merge List Size for Block and Sub-Block Merge Modes," Joint Video Exploration Team (JVET) of ITU-T SG 16 WP 3 and ISO/IEC JTC 1/SC 29/WG 11, 13th Meeting, Marrakesh, MA, Jan. 9-18, 2019, document JVET-M0406, 2019.

"JEM-7.0: https://jvet.hhi.fraunhofer.de/svn/svn_HMJEMSoftware/tags/ HM-16.6-JEM-7.0.".

International Search Report and Written Opinion from International Patent Application No. PCT/CN2020/075494 dated May 21, 2020 (12 pages).

International Search Report and Written Opinion from International Patent Application No. PCT/CN2020/075496 dated May 20, 2020 (14 pages).

International Search Report and Written Opinion from International Patent Application No. PCT/CN2020/075497 dated May 20, 2020 (10 pages).

International Search Report and Written Opinion from International Patent Application No. PCT/CN2020/075499 dated May 28, 2020 (13 pages).

Non-Final Office Action from U.S. Appl. No. 17/330,836 dated Aug. 11, 2021.

* cited by examiner

MOTION CANDIDATE LIST CONSTRUCTION FOR INTRA BLOCK COPY (IBC) MODE AND NON-IBC INTER MODE

CROSS REFERENCE TO RELATED APPLICATIONS

This application is a continuation of International Patent Application No. PCT/CN2020/075496, filed on Feb. 17, 2020, which claims the priority to and benefits of International Patent Application No. PCT/CN2019/075302, filed on Feb. 17, 2019. All the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to constructing motion candidate lists for intra block copy mode are described. The described methods may be applied to both the existing video processing standards (e.g., High Efficiency Video Coding (HEVC)) and future video processing standards or video processing hardware/software such as video codecs.

In one representative aspect, the disclosed technology may be used to provide a method for video processing. This method includes performing a conversion between a current video block of a video and a coded representation of the video using an intra block copy (IBC) merge list of candidates; and making a decision regarding whether to update the IBC merge list by adding a merge candidate based on a condition.

In another representative aspect, the disclosed technology may be used to provide a method for video processing. This method includes maintaining, for a conversion between a current video block of a video and a coded representation of the video, an intra block copy (IBC) merge list in which merge candidates are added according to a rule; and performing the conversion using the IBC merge list.

In another representative aspect, the disclosed technology may be used to provide a method for video processing. This method includes maintaining, for a conversion between a current video block of a video and a coded representation of the video, an intra block copy (IBC) merge list in which a special IBC merge candidate is added; and performing the conversion using the IBC merge list, wherein the special IBC merge candidate is selected by the current video block, a prediction block of the current video block is derived based on one or more default values without using motion compensation.

In another representative aspect, the disclosed technology may be used to provide a method for video processing. This method includes constructing, during a conversion between a current video block and a coded representation of the current video block, an intra block copy (IBC) motion candidate list, wherein insertion of motion candidates to the IBC motion candidate list is subject to a size restriction; and performing the conversion using the IBC motion candidate list.

In another representative aspect, the disclosed technology may be used to provide a method for video processing. This method includes constructing, for a conversion between a current video block of a video and a coded representation of the video, an intra block copy (IBC) motion candidate list according to a rule of construction; and performing the conversion based on the IBC motion candidate list, and wherein the rule of construction specifies to check spatial neighboring blocks at different relative positions for addition to the IBC motion candidate list than spatial neighboring blocks that are checked for adding to a regular motion candidate list.

In another representative aspect, the disclosed technology may be used to provide a method for video processing. This method includes constructing, for a conversion between a current video block of a video and a coded representation of the video, an intra block copy (IBC) motion candidate list based on a color component identity of the current video block; and performing the conversion based on the IBC motion candidate list.

In another representative aspect, the disclosed technology may be used to provide a method for video processing. This method includes determining, for a conversion between a current video block of a video and a coded representation of the video, whether an intra block copy (IBC) mode in which a prediction block for the current video block is calculated based on a block vector in a picture that includes current video block is enabled based on a rule on a block dimension; and performing the conversion based on the determining.

In another representative aspect, the disclosed technology may be used to provide a method for video processing. This method includes determining, for a conversion between a current video block of a video and a coded representation of the video, to disable using of an intra block copy (IBC) mode in which a prediction block for the current video block is calculated based on a block vector in a picture that includes current video block based on a position of the current video block; and performing the conversion based on the determining.

In another representative aspect, the disclosed technology may be used to provide a method for video processing. This method includes performing a conversion between a current video block of a video region of a video and a coded representation of the video, wherein an indication of whether a rule controlling construction or updating of an intra block copy (IBC) mode is included in the coded representation at the video region level, and wherein the intra block copy mode includes generating a prediction block using at least a block vector pointing in a picture that includes the current video block.

In another representative aspect, the disclosed technology may be used to provide a method for video processing. This method includes constructing, for a conversion between a current video block of a video and a coded representation of the video, an intra block copy (IBC) motion candidate list that stores one or more candidates that point in a picture containing the current video block for representing the current video block; and performing the conversion using the IBC motion candidate list, wherein the coded representation includes a first field to derive a maximum size of the IBC motion candidate list and a second field, different from the first field, to derive a maximum size of a regular motion candidate list.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
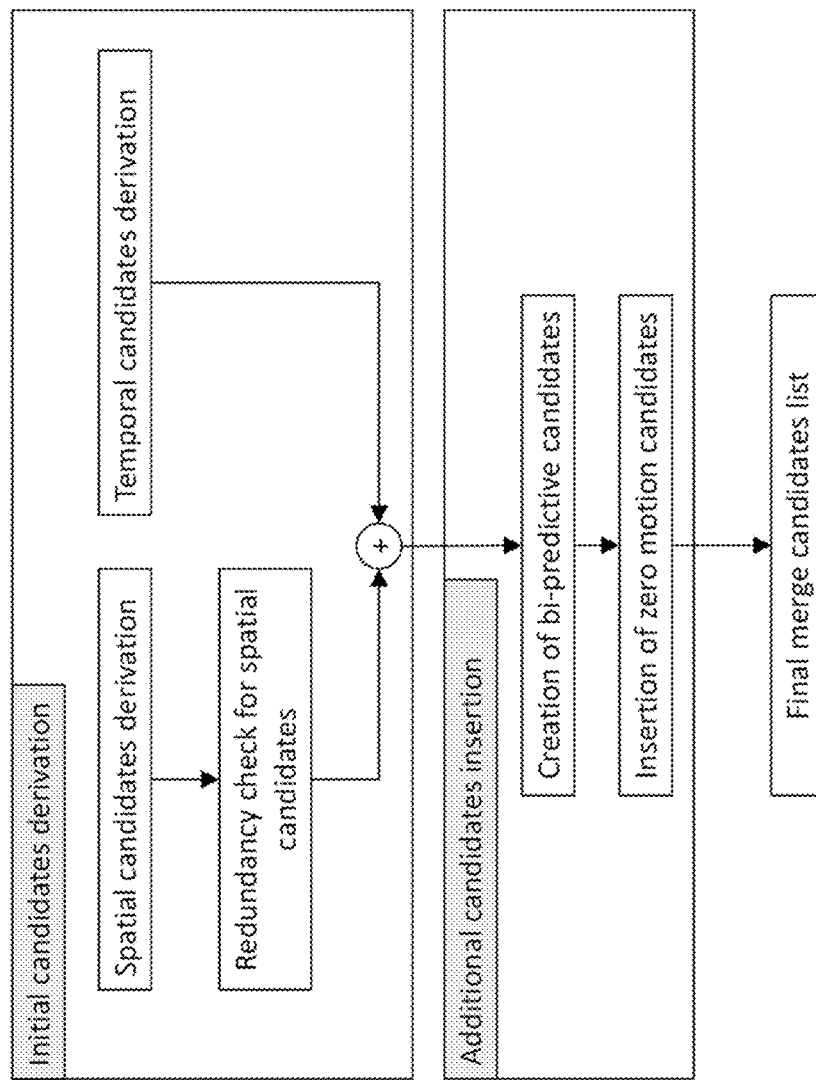
FIG. 1 shows an example of constructing a merge candidate list.

Due to the increasing demand of higher resolution video, video processing methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
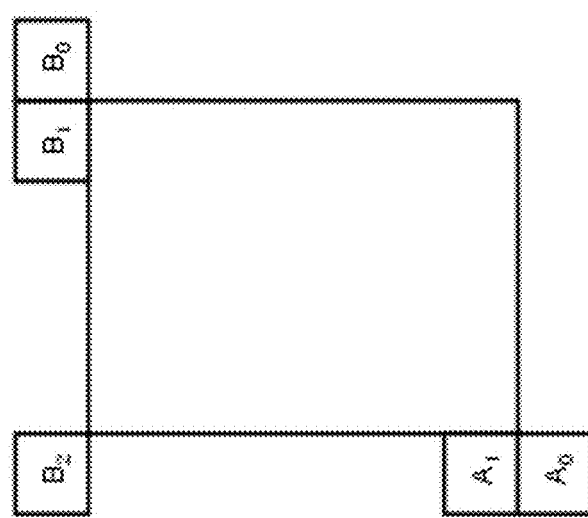
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
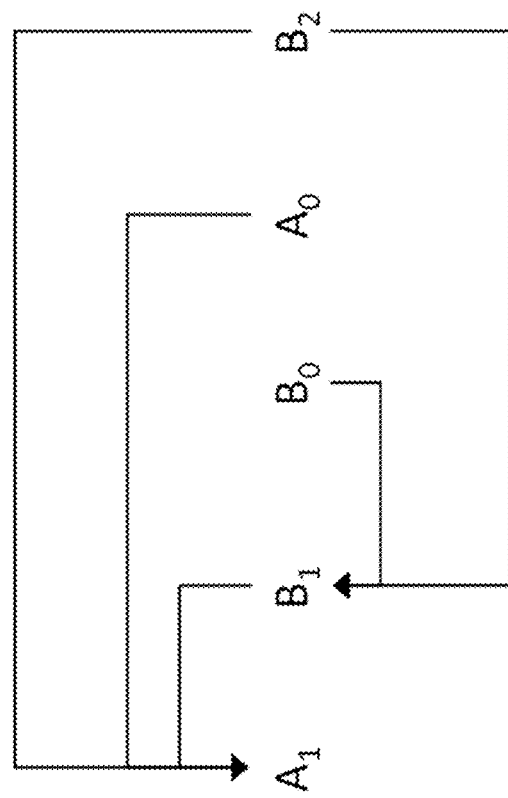
FIG. 3 shows an example of candidate pairs subject to a redundancy check of spatial merge candidates.
Figure 4B:
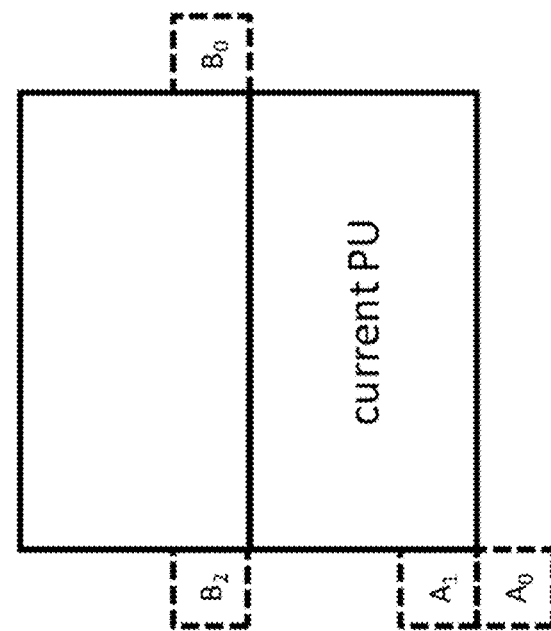
FIGS. 4A and 4B show examples of the position of a second prediction unit (PU) based on the size and shape of the current block.
Figure 4A:
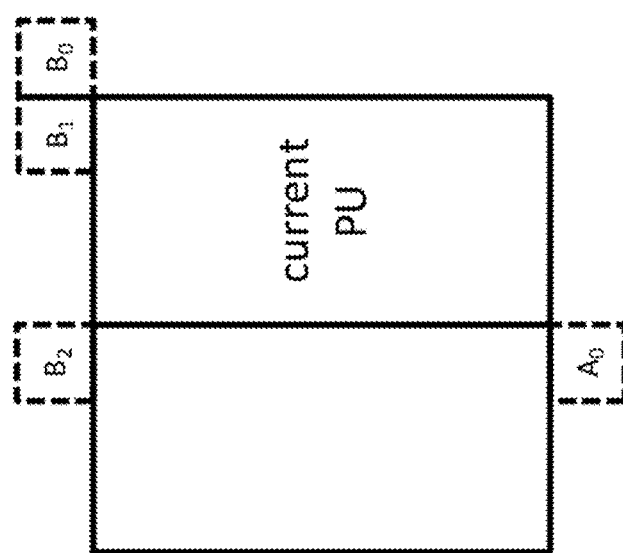

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
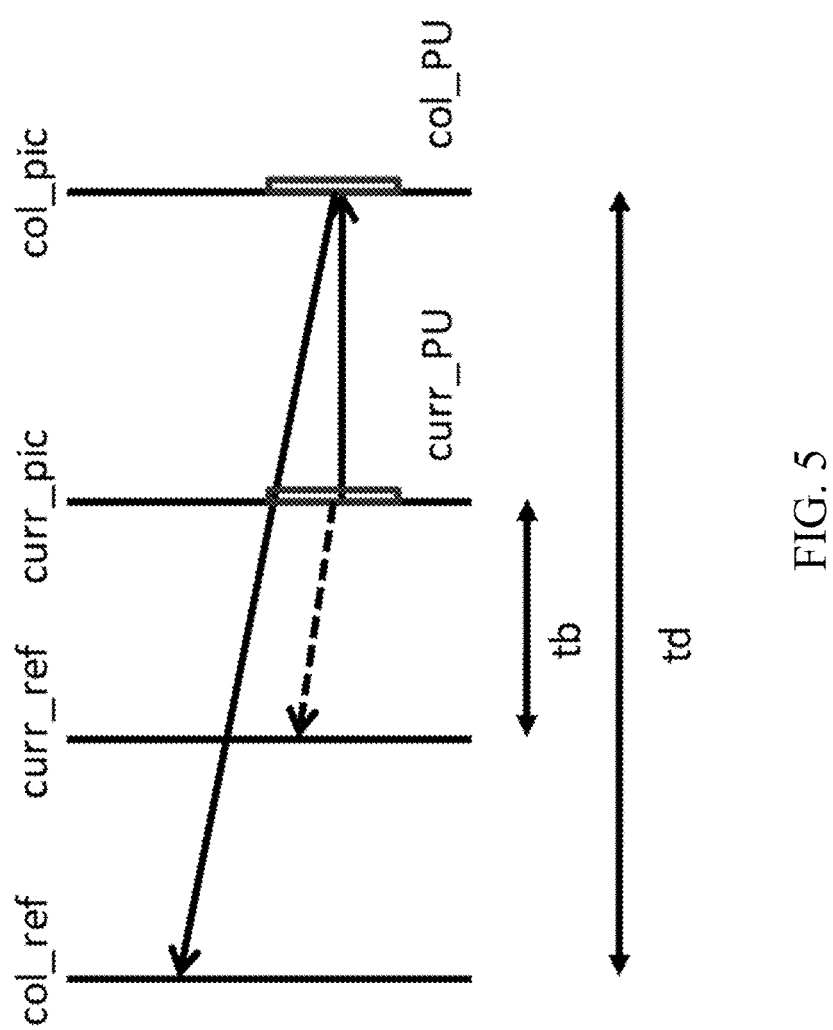
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
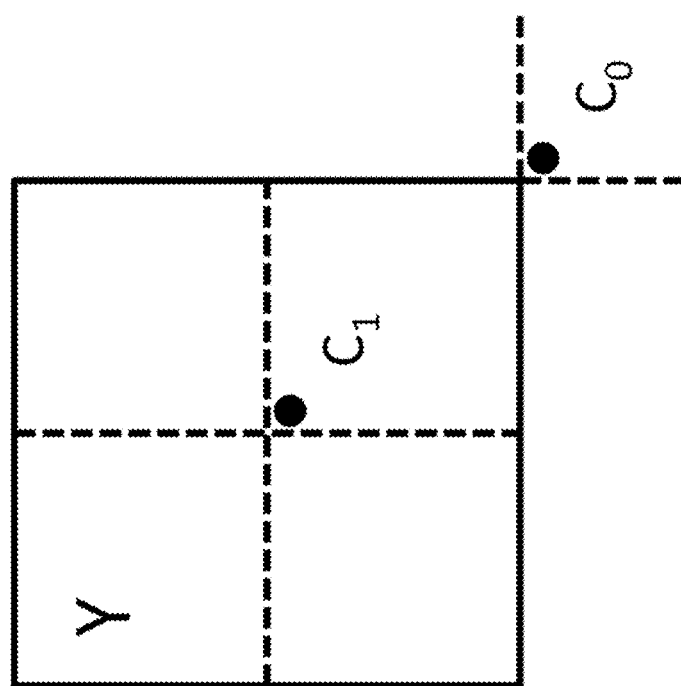
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
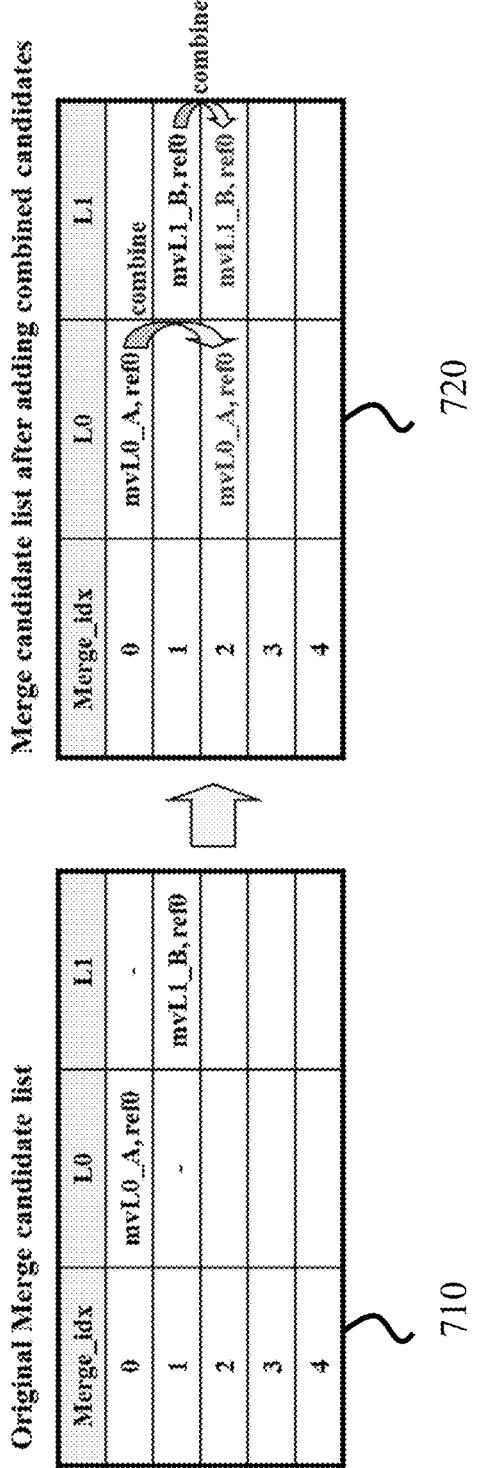
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Deriving AMVP Candidates

Figure 8:
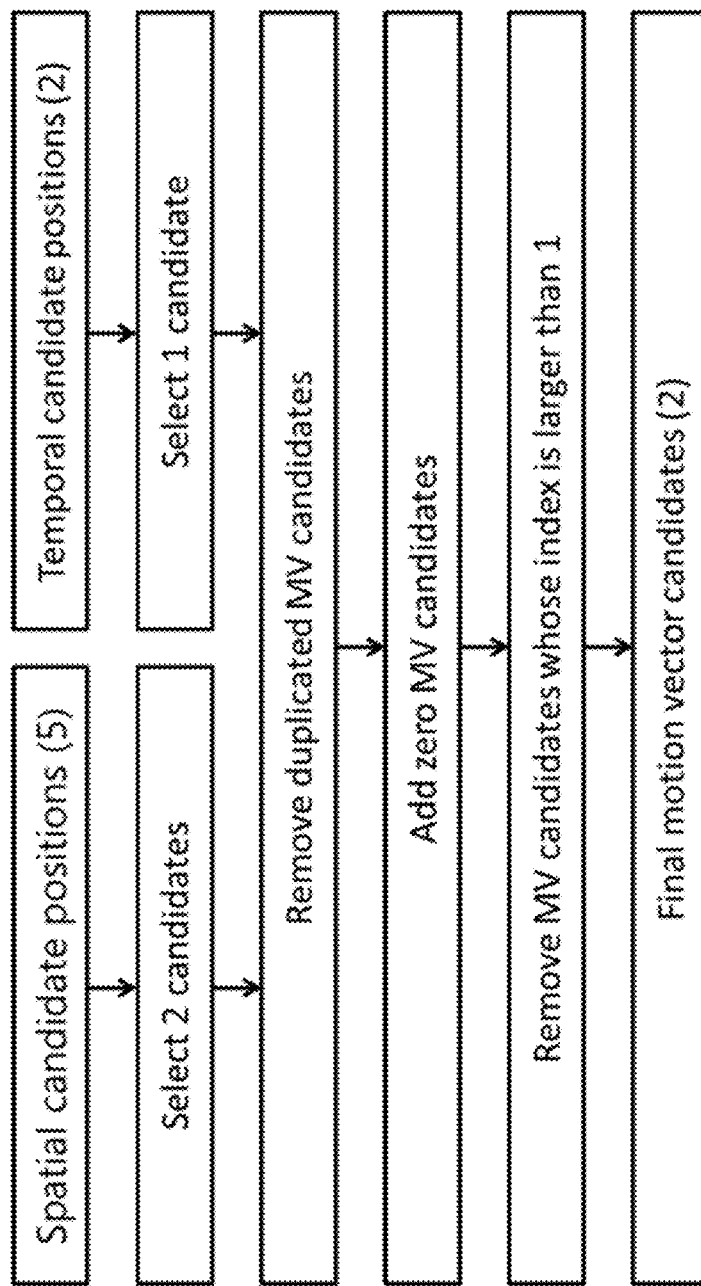
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
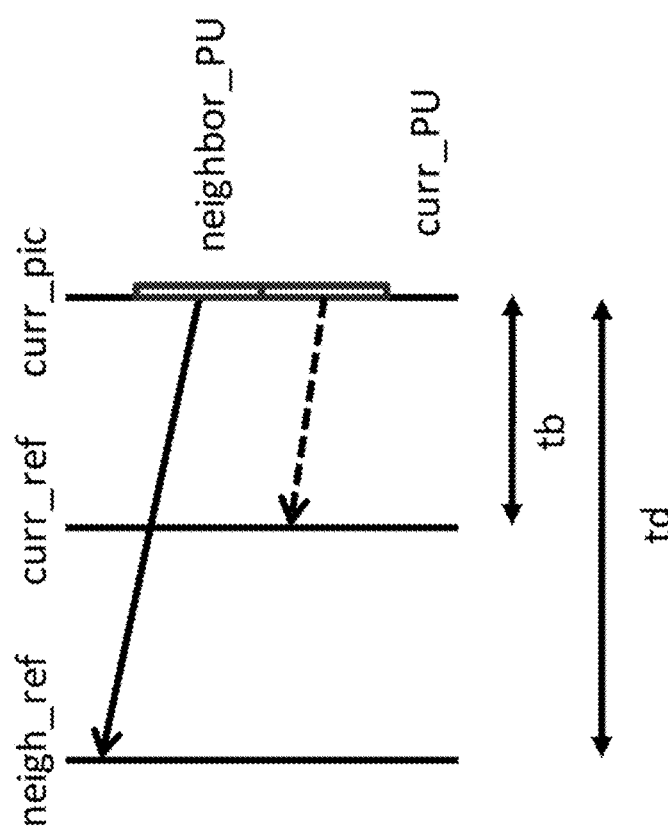
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in VVC

There are several new coding tools for inter prediction improvement, such as Adaptive motion vector difference resolution (AMVR) for signaling MVD, affine prediction mode, Triangular prediction mode (TPM), Advanced TMVP (ATMVP, aka SbTMVP), Generalized Bi-Prediction (GBI), Bi-directional Optical flow (BIO).

In VVC, a QuadTree/BinaryTree/MulitpleTree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

2.1 Pairwise Average Candidates

Pairwise average candidates are generated by averaging predefined pairs of candidates in the current merge candidate list, and the predefined pairs are defined as $\{(0, 1), (0, 2), (1, 2), (0, 3), (1, 3), (2, 3)\}$, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replace the combined candidates in HEVC standard.

The complexity analysis of pairwise average candidates is summarized in the Table 1. For the worst case of additional calculations for averaging (the last column in Table 1), 4 additions and 4 shifts are needed for each pair (MVx and MVy in L0 and L1), and 4 reference index comparisons are needed for each pair (refIdx0 is valid and refIdx1 is valid in L0 and L1). There are 6 pairs, leading to 24 additions, 24 shifts, and 24 reference index comparisons in total. The combined candidates in HEVC standard use 2 reference index comparisons for each pair (refIdx0 is valid in L0 and refIdx1 is valid in L1), and there are 12 pairs, leading to 24 reference index comparisons in total.

TABLE 1

Operation analysis for the pairwise average candidates

| Merge list size | Max number of potential candidates | Max number of candidate comparisons | Max number of MV scalings | Max number of temporal candidates | Additional local buffer | Max number of memory access | Others |
|---|---|---|---|---|---|---|---|
| 6, 8, 10 | 6 | 0 | 0 | 0 | 0 | 0 | Replace HEVC combined candidates, need additional calculations for averaging |

2.2 History-Based Motion Vector Prediction (HMVP)

Figure 10:
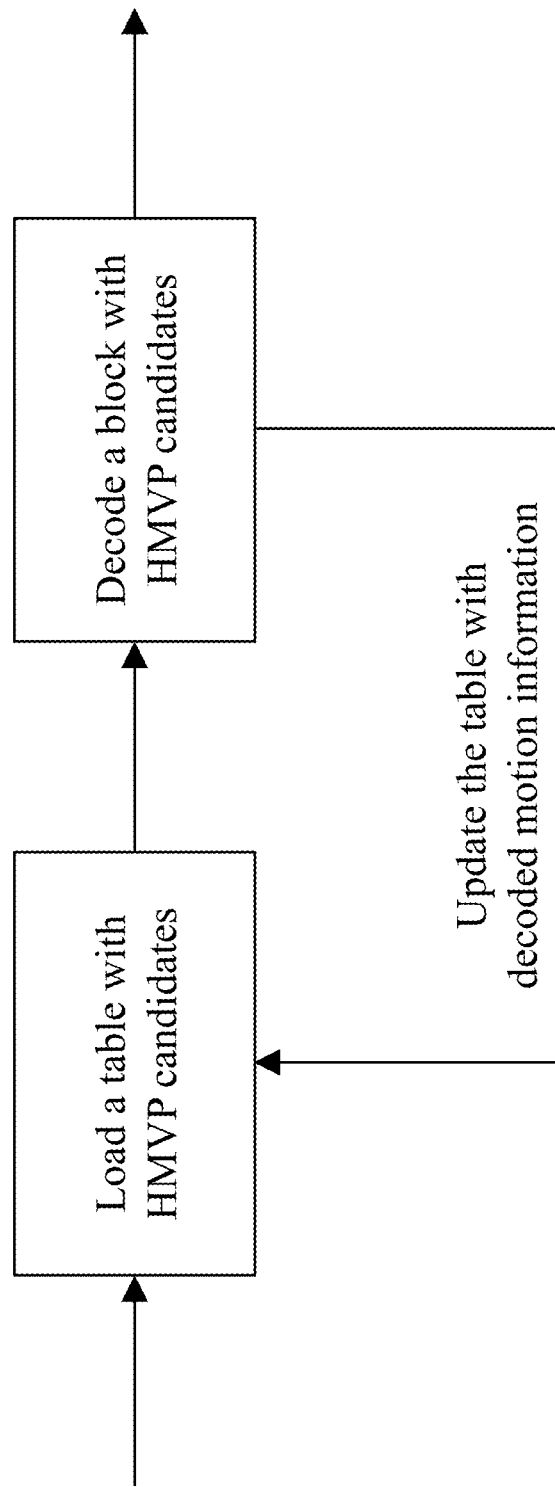
FIG. 10 shows an example of the coding flow for history-based motion vector prediction (HMVP) candidates.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 10.

In one example, the table size is set to be L (e.g., L=16 or 6, or 44), which indicates up to L HMVP candidates may be added to the table.

Figure 11:
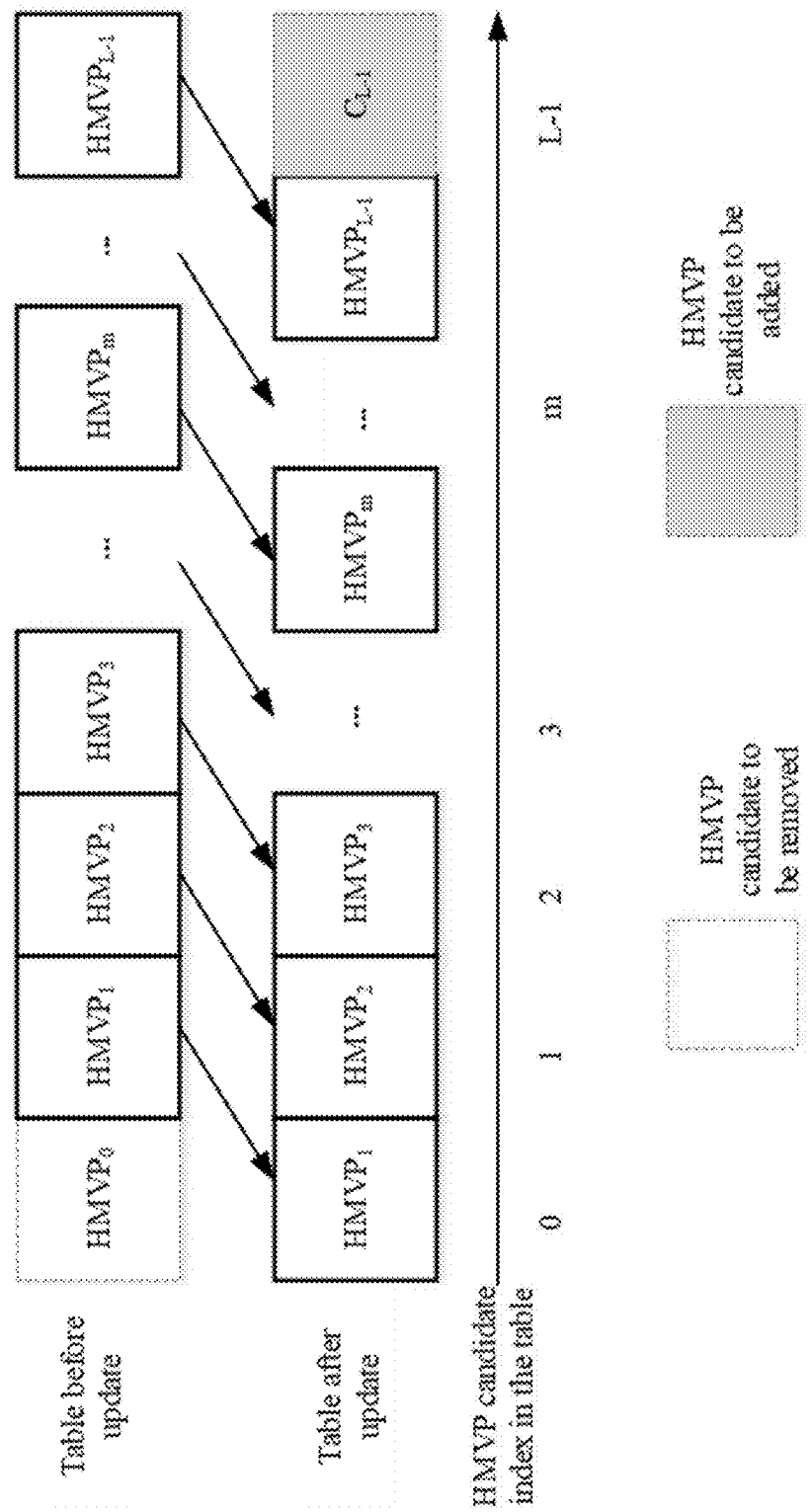
FIG. 11 shows an example of updating a table in the HMVP method.

1) In one embodiment, if there are more than L HMVP candidates from the previously coded blocks, a First-In-First-Out (FIFO) rule is applied so that the table always contains the latest previously coded L motion candidates. FIG. 11 depicts an example wherein the FIFO rule is applied to remove a HMVP candidate and add a new one to the table used in the proposed method.
2) In another embodiment, whenever adding a new motion candidate (such as the current block is inter-coded and non-affine mode), a redundancy checking process is applied firstly to identify whether there are identical or similar motion candidates in LUTs.

3. Intra Block Copy

Figure 12:
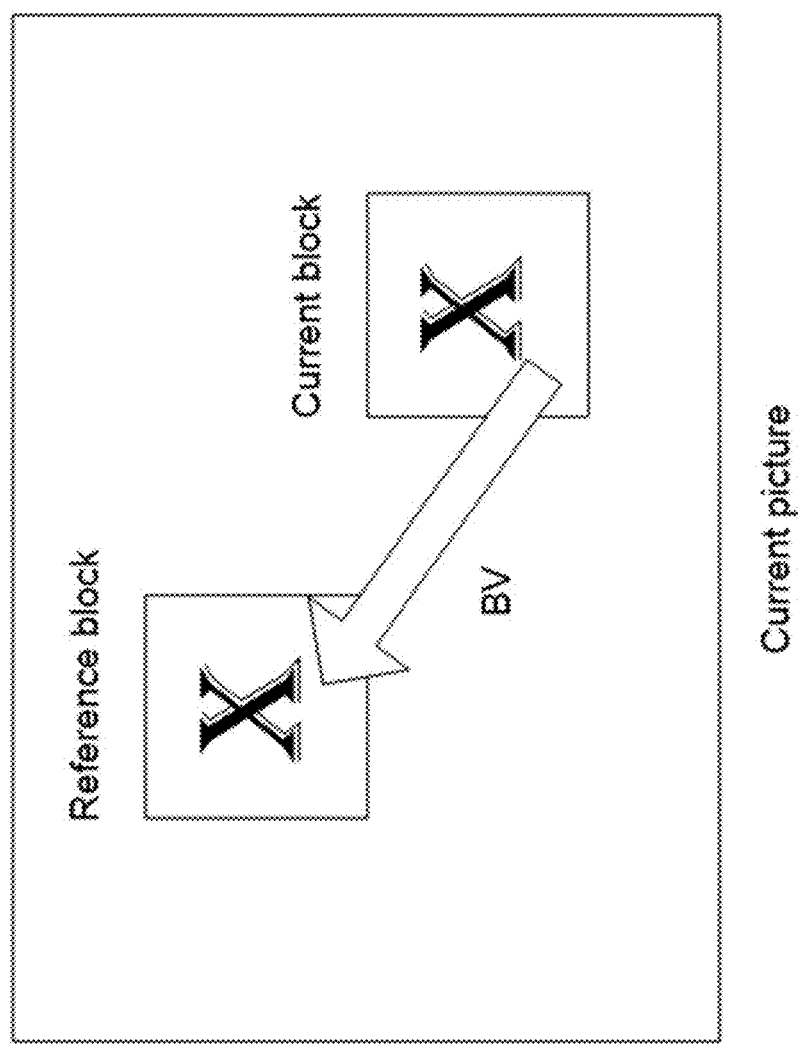
FIG. 12 shows an example of intra block copy.

Intra block copy (IBC), a.k.a. current picture referencing, has been adopted in HEVC Screen Content Coding extensions (HEVC-SCC) and the current VVC test model (VTM-3.0). IBC extends the concept of motion compensation from inter-frame coding to intra-frame coding. As demonstrated in FIG. 12, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

4. IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX} = (\text{ChromaArrayType}==0)?0:(\text{myCLX}[0] \& 0x7?2:0) \qquad (8\text{-}104)$$

$$\text{offsetY} = (\text{ChromaArrayType}==0)?0:(\text{myCLX}[1] \& 0x7?2:0) \qquad (8\text{-}105)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, YNbY) set equal to (xPb+(mvLX[0]>>2)−offsetX, yPb+(mLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mLX[1]>>2)+nPbH−1+offsetY) as inputs, the output shall be equal to TRUE.

One or both of the following conditions shall be true:
The value of (mvLX[0]>>2)+nPbW+xB1+offsetX is less than or equal to 0.
The value of (mvLX[1]>>2)+nPbW+yB1+offsetY is less than or equal to 0.

The following condition shall be true:

$$(xPb+(\text{mvLX}[0]>>2)+nPbSw-1+\text{offsetX})/\text{CtbSizeY} - xCb/\text{CtbSizeY} <= yCb/\text{CtbSizeY} - (yPb+ (mLX[1]>>2)+nPbSh-1+\text{offsetY})/\text{CtbSizeY} \qquad (8\text{-}106)$$

Thus, the case that the reference block overlaps with the current block or the reference block is outside of the picture will not happen. There is no need to pad the reference or prediction block.

5. IBC in VVC Test Model

In the current VVC test model, i.e. VTM-3.0 design, the whole reference block should be with the current coding tree unit (CTU) and does not overlap with the current block. Thus, there is no need to pad the reference or prediction block.

5.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in FIG. 2. The order of derivation is A1, B1, B0, A0 and B2. Position B2 is considered only when any PU of position A1, B1, B0, A0 is not available (e.g. because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

5.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check A0, A1 until an available candidate is found.
  Check B0, B1, B2 until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

6. Drawbacks of Existing Implementations

Suppose the maximum IBC merge list size is MaxMrgListSizeIbc, the maximum IBC AMVP list size is MaxAmvpListSizeIbc and the maximum merge list size of regular merge mode is MaxMrgListSize.

The current IBC merge mode may have the following problems:

Invalid merge candidates may be inserted into the IBC merge list even though they shall never be selected. This is inefficient because it may require more bits on signaling the merge index.

Number of available IBC merge candidates in the IBC merge list may be smaller than MaxMrgListSizeIbc. This is inefficient because the IBC merge index is coded with truncated unary code assuming the maximum length of the code is MaxMrgListSizeIbc−1.

7. Example Methods for Constructing Motion Candidate Lists for Intra Block Copy

Embodiments of the presently disclosed technology overcome the drawbacks of existing implementations, thereby providing video coding with higher coding efficiencies. The construction of motion candidate lists for intra block copy mode, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

It is assumed that a video block has height H and width W.

Figure 13:
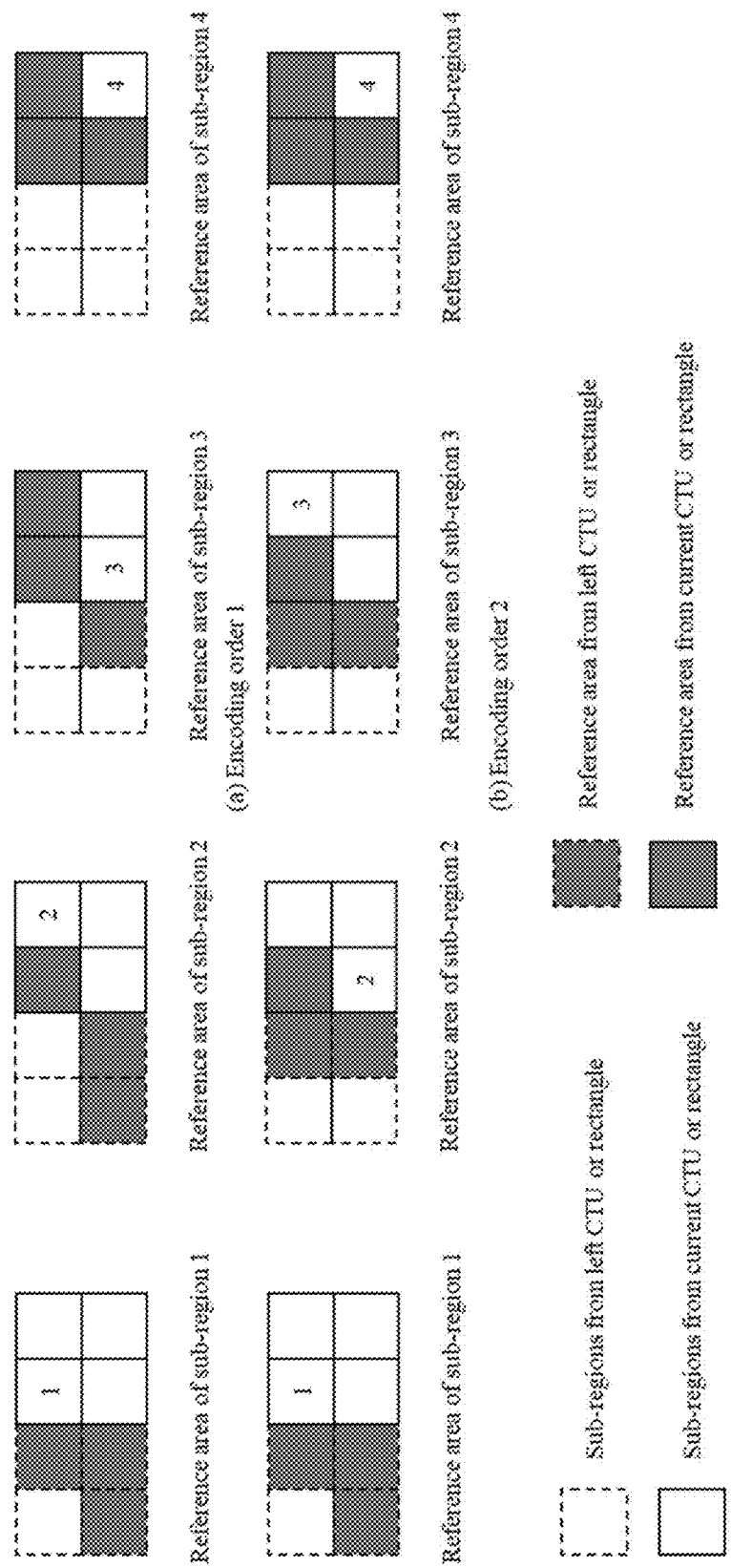
FIG. 13 shows different examples of allowed reference areas.

1. Some IBC merge candidates may be considered as "unavailable" and may not be inserted into the IBC merge list.
   a. In one example, if the reference block identified by a merge candidate overlapped with the current block, the merge candidate may be considered as "unavailable".
   b. In one example, if partial samples of the reference block identified by a merge candidate is outside of the picture, the merge candidate may be considered as "unavailable".
   c. In one example, if all samples of the reference block identified by a merge candidate is outside of the picture, the merge candidate may be considered as "unavailable".
   d. In one example, if partial samples of the reference block identified by a merge candidate is outside of the reconstructed area, the merge candidate may be considered as "unavailable".
   e. In one example, if all samples of the reference block identified by a merge candidate is outside of the reconstructed area, the merge candidate may be considered as "unavailable".
   f. In one example, if partial samples of the reference block identified by a merge candidate is outside of the valid area restricted by some constrains, the merge candidate may be considered as "unavailable".
   g. In one example, if all samples of the reference block identified by a merge candidate is outside of the valid area restricted by some constraints, the merge candidate may be considered as "unavailable".
   h. In one example, the constraint may be that the reference sample cannot be from the above CTU row or area above the above CTU row.
   i. In one example, the constraint may be that the reference sample in the reference block cannot be within the current block.

j. In one example, the constraint may be that the reference sample can be only from the current CTU row.
k. In one example, the constraint may be that the reference sample cannot be from the left CTU.
l. In one example, the constraint may be that the reference sample can be only from the current CTU.
m. In one example, the constraint may be that the reference sample can be only from a predefined area.
  i. The area may depend on the position of the current block.
  ii. The area may depend on the dimensions of the current block.
  iii. The area may depend on the position of a M×N block that contains the current block. e.g. M=N=128 or M=N=64.
  iv. The area may depend on the resolution of the picture.
  v. The area may depend on the encoding/decoding order of the blocks within a CTU or a M×N rectangle.
  vi. In one example, the area may include samples in the left CTU and samples in the current CTU.
  vii. In one example, the area may include samples in the left CTU or/and samples in the above CTU and samples in the current CTU.
  viii. In one example, the tile/slice/picture may be split into N×M (N>0 and M>0, for example, N=M=128) rectangles, and for a block in a N×M rectangle, the area may include samples in the left N×M rectangle and samples in the current N×M rectangle.
    1. Alternatively, the area may include samples in the left N×M rectangle or/and samples in the above N×M rectangle and samples in the current N×M rectangle.
  ix. In one example, the CTU or/and the N×M rectangle may be split into K (K>=1, for example, K=4) sub-regions (for example, sub-region size is 64×64), and the area may depend on the position or/and the encoding/decoding order of the sub-region. Examples are shown in FIG. 13.
    1. In one example, sub-regions may be with same dimension.
    2. In one example, different sub-regions may be with different dimensions.
n. In one example, spatial candidates from certain spatial neighboring/non-adjacent blocks may be considered as "unavailable".
  i. Alternatively, spatial candidates may be always inserted into the IBC merge list.
o. In one example, certain HMVP candidates may be considered as "unavailable".
  i. Alternatively, HMVP candidates may be always inserted into the IBC merge list.
p. In one example, certain pairwise candidates may be considered as "unavailable".
  i. Alternatively, pairwise candidates may be always inserted into the IBC merge list.
q. In one example, a candidate is not put into the IBC merge list if it is determined to be "unavailable".
  i. In an alternative example, a candidate is still put into the IBC merge list if it is determined to be "unavailable", but such a candidate cannot be selected in a conformance bit-stream.
r. In one example, IBC merge mode cannot be signaled if all candidates are determined to be "unavailable".
s. In an alternative example, IBC merge mode still can be signaled if all candidates are determined to be "unavailable", but IBC merge mode cannot be selected in a conformance bit-stream.

2. Additional IBC merge candidates may be inserted into the IBC merge list.
  a. In one example, default merge candidates (such as derived from the block dimension) may be inserted into the IBC merge list.
    i. For example, (−W, −H) may be inserted.
    ii. For example, (−W, −3*H/2) may be inserted.
    iii. For example, (−3*W/2, −H) may be inserted.
    iv. For example, (−3*W/2, −3*H/2) may be inserted.
    v. For example, (−2*W, 0) may be inserted.
    vi. For example, (0, −2*H) may be inserted.
    vii. For example, (−W, 0) may be inserted.
    viii. For example, (0, −H) may be inserted.
    ix. The default merge candidates may depend on the position or/and the dimension of the block.
    x. The order to insert default merge candidates may depend on the position or/and the dimension of the block.
    xi. The default merge candidates may be signaled from the encoder to the decoder such as in VPS/SPS/PPS/picture header/slice header/tile group header etc.
  b. One or multiple offset candidates may be derived from selected available IBC merge candidates, such as by adding some offsets to the motion vectors.
    i. In one example, the selected available IBC merge candidates may include one or multiple IBC merge candidates derived from certain spatial neighboring/non-adjacent blocks (such as only from A1; or A1 and B1 in FIG. 2-2).
    ii. Alternatively, the selected available IBC merge candidates may include one or multiple HMVP candidates derived from HMVP tables.
    iii. Alternatively, the selected available IBC merge candidates may include one or multiple pairwise merge candidates.
    iv. Alternatively, furthermore, "unavailable" merge candidates (e.g., those candidates defined in bullet 1) may be used for generating new merge candidates.
      1. Alternatively, "unavailable" additional IBC merge candidates may be not allowed.
    v. Alternatively, the selected available IBC merge candidates may be defined as all available IBC candidates before adding these offset candidates.
      1. Alternatively, the selected available IBC merge candidates may be defined as the first K (K>=0) IBC candidates before adding these offset candidates. The variable K is no larger than the number of available IBC candidates.
    vi. In one example, N1 (N1>=0) MV offsets, denoted by (OffsetX$_i$, OffsetY$_i$) (1<=i<=N1), may be added to the spatial IBC merge candidates to generate new merge candidates.
      1. In one example, N1 may be different for different spatial merge candidates.
    vii. In one example, N2 (N2>=0) MV offsets may be added to the HMVP merge candidates to generate new merge candidates.
      1. In one example, N2 may be different for different HMVP merge candidates.

viii. In one example, N3 (N3>=0) MV offsets may be added to the pairwise merge candidates to generate new merge candidates.
    1. In one example, N3 may be different for different pairwise merge candidates.
ix. In one example, N4 (N4>=0) MV offsets may be added to the current available merge candidates to generate new merge candidates.
    1. In one example, N4 may be different for different merge candidates.
    2. For example, N4 may be greater than 0 only for the first available merge candidate.
x. The MV offsets may depend on the merge candidates or/and the position or/and the dimension of the block or/and the encoding/decoding order of blocks in a CTU or M×N rectangle.

c. The additional IBC merge candidates may be inserted after certain pairwise merge candidate or all pairwise merge candidates.
    i. Alternatively, the additional IBC merge candidates may be interleaved with certain pairwise merge candidates or/and default merge candidates.
d. The additional IBC merge candidates may be inserted after certain or all default merge candidates.
    i. Alternatively, the additional IBC merge candidates may be inserted before certain or all default merge candidates.
    ii. Alternatively, the additional IBC merge candidates may be interleaved with default merge candidates.
e. The additional IBC merge candidates may be inserted after checking a certain spatial neighboring block, e.g., B0.
    i. Alternatively, furthermore, the additional IBC merge candidates may be interleaved with remaining spatial neighboring candidates.
f. The additional IBC merge candidates may be inserted after certain spatial merge candidate or all spatial merge candidates.
    i. Alternatively, furthermore, before HMVP merge candidates.
    ii. Alternatively, the additional IBC merge candidates may be inserted after spatial merge candidates and interleaved with HMVP merge candidates or/and pairwise merge candidates.
    iii. Alternatively, the additional IBC merge candidates may be interleaved with certain spatial merge candidates or/and HMVP merge candidates or/and pairwise merge candidates or/and default merge candidates.
g. The additional IBC merge candidates may be inserted after certain HMVP merge candidate or all HMVP merge candidates.
    i. Alternatively, furthermore, before pairwise merge candidates.
    ii. Alternatively, the additional IBC merge candidates may be inserted after HMVP merge candidates and interleaved with pairwise merge candidates.
    iii. Alternatively, the additional IBC merge candidates may be interleaved with certain HMVP merge candidates or/and pairwise merge candidates or/and default merge candidates.

3. Special IBC merge candidates may be inserted into the IBC merge list. When a special IBC merge candidate is selected by a block, some default values may be used to derive the prediction block and no motion compensation is performed.
    a. In one example, if a special IBC merge candidate is selected, one default value may be used to predict the entire block.
    b. In one example, if a special IBC merge candidate is selected, the block may be split into N (N>=1) sub-blocks and different default values may be used to predict different sub-blocks.
    c. In one example, N (N>=0) special IBC merge candidates may be inserted into the IBC merge list.
    d. In one example, some special IBC merge candidates may be inserted into the IBC merge list more than once.
    e. In one example, different special IBC merge candidates may correspond to different default values used for predicting the block.
    f. In one example, special IBC merge candidates may be inserted into the IBC merge list only when number of "available" candidates is smaller than MaxMrgListSizeIbc.
        i. Alternatively, furthermore, special IBC merge candidates may be inserted into IBC merge list until the list size is equal to MaxMrgListSizeIbc.
    g. In one example, special IBC merge candidates may be inserted after some kinds of merge candidates.
        i. For example, special IBC merge candidates may be inserted after the inherited merge candidates.
            1. Alternatively, furthermore, before the HMVP merge candidates.
        ii. For example, special IBC merge candidates may be inserted after the HMVP merge candidates.
            1. Alternatively, furthermore, before the pairwise merge candidates.
        iii. For example, special IBC merge candidates may be inserted after the pairwise merge candidates.
        iv. For example, special IBC merge candidates may be inserted after the additional merge candidates described in Example 2.
        v. For example, special IBC merge candidates may be inserted after all other merge candidates.
    h. In one example, special IBC merge candidates may be interleaved with other merge candidates.
    i. Default values may be signaled in SPS/VPS/PPS/tile group header/slice header.
    j. Default values may be derived at decoder implicitly.
        i. For example, 1<<(bitDepth−1) may be used as the default value, wherein bitDepth is the bit depth of the sample.
        ii. For example, 1<<bitDepth may be used as the default value.
        iii. For example, 0 may be used as the default value.
    k. Default values may depend on the bit depth of samples.
    l. Default values may be different for different color components.
    m. Default values may be derived based on previously decoded pictures/slices/tiles.
    n. Alternatively, furthermore, residual block is set to all zero coefficients, i.e., default values are used to derive the reconstruction block of current block.

4. The spatial neighboring blocks used for constructing IBC merge list may be different from that used for the regular merge list.
    a. In one example, when motion information of a spatial neighboring block results in an unavailable IBC merge candidate, an adjacent block of the spatial neighboring block may be further checked.

b. In one example, motion information derived from the adjacent blocks of the spatial neighboring blocks may be added after all candidates derived from the spatial neighboring blocks (such as A1, B1, A0, B0, B2 in FIG. 2-2).
c. Alternatively, when motion information of a spatial neighboring block results in an unavailable IBC merge candidate, the motion information of an adjacent block of the spatial neighboring block may be added instead, if it is not unavailable.

5. At most K1 (K1>=1) spatial merge candidates may be inserted into the IBC merge list
    a. K1 may depend MaxMrgListSizeIbc.
6. At most K2 (K2>=0) HMVP merge candidates may be inserted into the IBC merge list
    a. K2 may depend MaxMrgListSizeIbc.
    b. K2 may be different from that used for regular merge mode, such as N is unequal to 5.
7. At most K3 (K3>=0) pairwise merge candidates may be inserted into the IBC merge list
    a. K3 may depend MaxMrgListSizeIbc.
    b. K3 may be different from that used for regular merge mode.
    c. K3 may be equal to zero, i.e., pairwise merge candidates may be never inserted into IBC merge list.
8. IBC mode may be enabled/disabled according to the rule on block dimension.
    a. In one example, when a block size contains less than M*H samples, e.g., 16 or 32 or 64 luma samples, IBC merge or/and IBC AMVP mode is not allowed.
    b. In one example, when a block size contains more than M*H samples, e.g., 16 or 32 or 64 luma samples, IBC merge or/and IBC AMVP mode is not allowed.
    c. Alternatively, when minimum size of a block's width or/and height is smaller than or no larger than X, IBC merge or/and IBC AMVP mode is not allowed. In one example, X is set to 8.
    d. Alternatively, when a block's width>th1 or >=th1 and/or a block's height>th2 or >=th2, IBC merge or/and IBC AMVP mode is not allowed. In one example, X is set to 64.
        i. For example, IBC merge or/and IBC AMVP mode is disabled for M×M (e.g., 128×128) block.
        ii. For example, IBC merge or/and IBC AMVP mode is disabled for N×M/M×N block, e.g., wherein N>=64, M=128.
        iii. For example, IBC merge or/and IBC AMVP mode is disabled for N×M/M×N block, e.g., wherein N>=4, M=128.
    e. Alternatively, when a block's width<th1 or <=th1 and/or a block's height<th2 or <=th2, IBC merge or/and IBC AMVP mode is not allowed. In one example, th1 and/or th2 is set to 8.
9. IBC mode may be disallowed according to the block position.
    a. In one example, the first CU in a CTU row cannot use IBC mode.
    b. In one example, the first CU in a CTU cannot use IBC mode.
    c. In one example, CUs to the left boundary of a CTU row cannot use IBC mode.
    d. In one example, CUs to the left boundary of a CTU cannot use IBC mode.
10. When IBC mode is disallowed, the flag to indicate IBC mode does not need to be sent and the IBC mode is inferred to be false.
11. An indication to tell whether proposed method is enabled or not may be signaled in PPS/VPS/picture header/slice header/tile group header/CTU groups.
    a. In one example, if separate tree partition structure (e.g., dual tree) is applied, the indications may be signaled more than once for one picture/slice/tile group/CTU.
    b. In one example, if separate tree partition structure (e.g., dual tree) is applied, the indications may be signaled separately for different color components.
        i. Alternatively, the indications may be signaled only for one color component and may be applied for all other color components.
12. It is proposed that MaxMrgListSizeIbc may be different from MaxMrgListSize.
    a. In one example, maximum merge candidate list size in IBC merge mode may be signaled in SPS/VPS/PPS/tile group header/slice header.
    b. In one example, MaxMrgListSizeIbc is smaller than MaxMrgListSize, and MaxMrgListSize−MaxMrgListSizeIbc may be signaled in SPS/VPS/PPS/tile group header/slice header.
    c. In one example, MaxMrgListSizeIbc is greater than MaxMrgListSize, and MaxMrgListSizeIbc−MaxMrgListSize may be signaled in SPS/VPS/PPS/tile group header/slice header.
13. How to construct the IBC merge list may depend on color components.
    a. For example, when dual-tree is used for luma and chroma components, the IBC merge lists may be different for luma and chroma components.
14. The above methods may be also applicable to the IBC AMVP mode.

The examples described above may be incorporated in the context of the method described below, e.g., method 1400, which may be implemented at a video decoder or a video encoder.

Figure 14A:
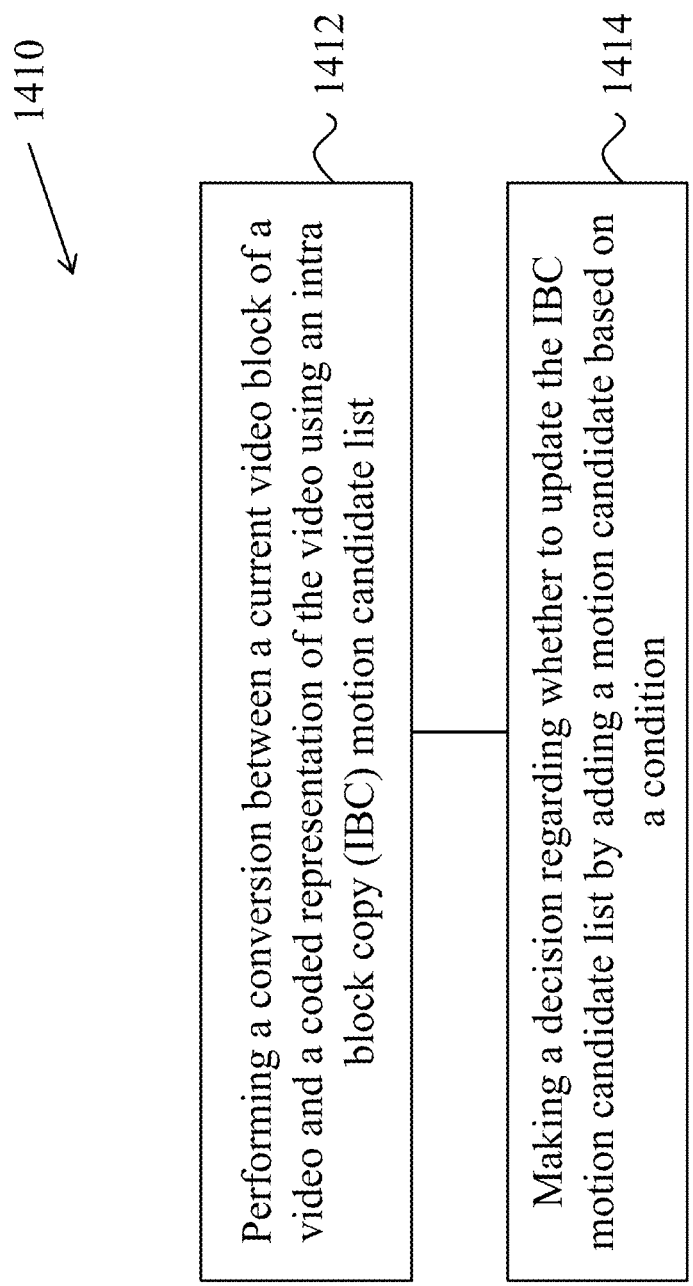
FIGS. 14A to 14C show flowcharts of example methods for video processing.

FIG. 14A shows a flowchart of an exemplary method for video processing. The method 1410 includes, at step 1412, performing a conversion between a current video block of a video and a coded representation of the video using an intra block copy (IBC) merge list of candidates. The method 1410 further includes, at step 1414, making a decision regarding whether to update the IBC merge list by adding a merge candidate based on a condition.

Figure 14B:
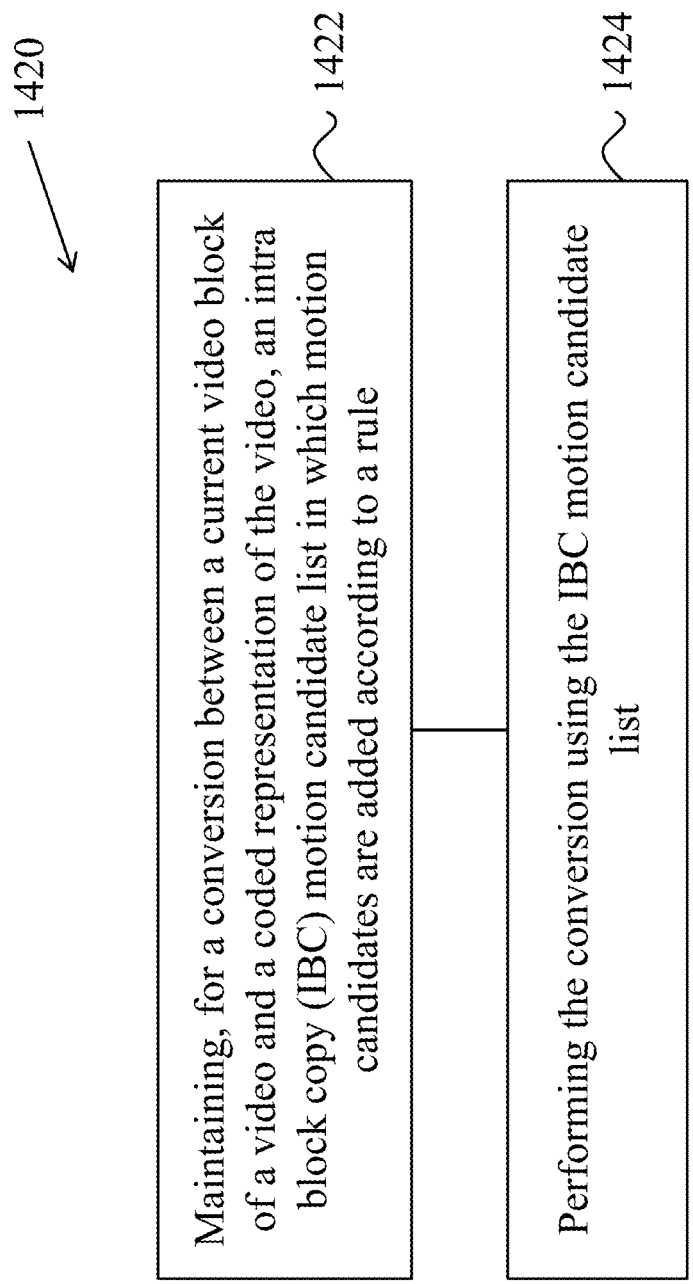
Figure 14C:
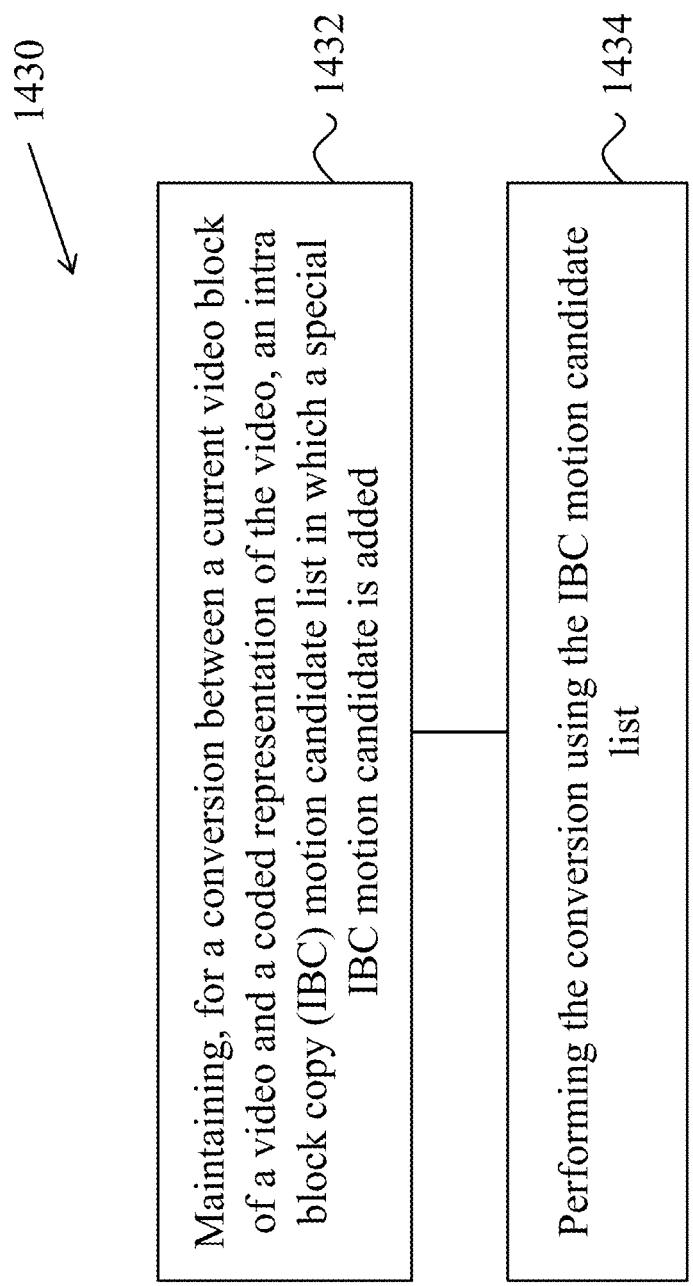

FIG. 14B shows a flowchart of an exemplary method for video processing. The method 1420 includes, at step 1422, maintaining, for a conversion between a current video block of a video and a coded representation of the video, an intra block copy (IBC) merge list in which merge candidates are added according to a rule. The method 1420 further includes, at step 1424, performing the conversion using the IBC merge list FIG. 14C shows a flowchart of an exemplary method for video processing. The method 1430 includes, at step 1432, maintaining, for a conversion between a current video block of a video and a coded representation of the video, an intra block copy (IBC) merge list in which a special IBC merge candidate is added. The method 1430 further includes, at step 1434, performing the conversion using the IBC merge list. In some implementations, the special IBC merge candidate is selected by the current video block, a prediction block of the current video block is derived based on one or more default values without using motion compensation.

Figure 15A:
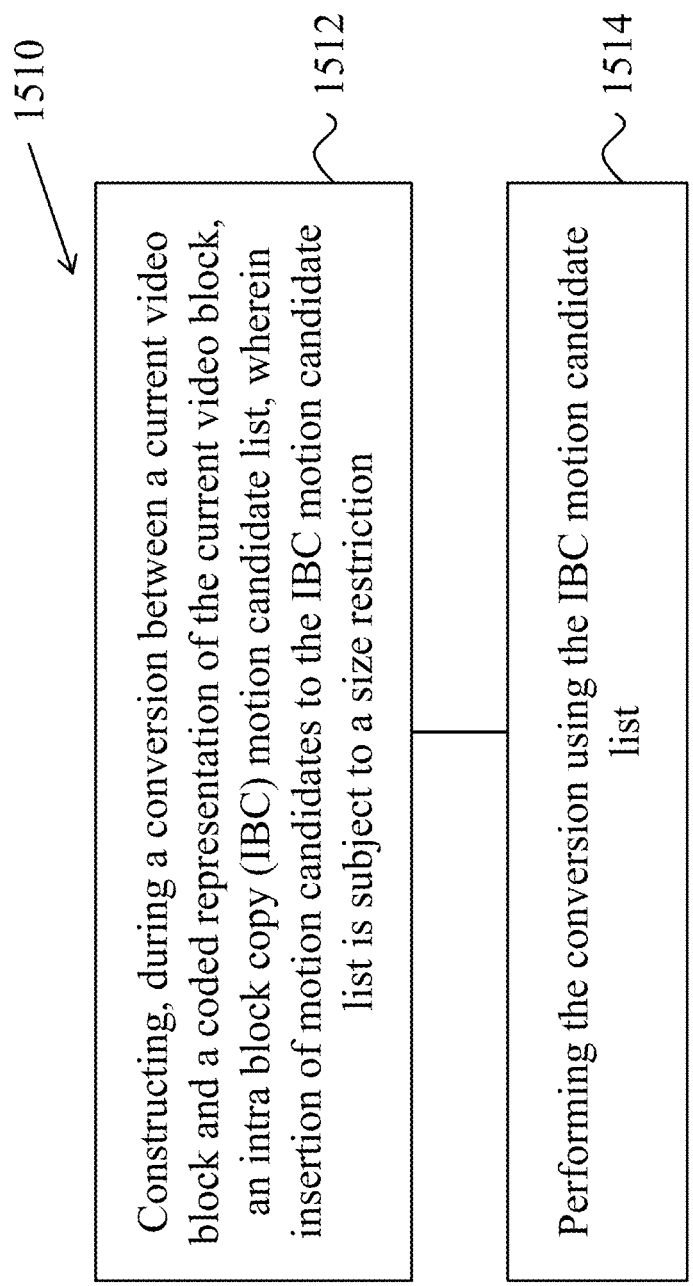
FIGS. 15A to 15C show flowcharts of example methods for video processing.

FIG. 15A shows a flowchart of an exemplary method for video processing. The method 1510 includes, at step 1512, constructing, during a conversion between a current video block and a coded representation of the current video block, an intra block copy (IBC) motion candidate list, wherein insertion of motion candidates to the IBC motion candidate list is subject to a size restriction. The method 1510 further includes, at step 1514, performing the conversion using the IBC motion candidate list.

Figure 15B:
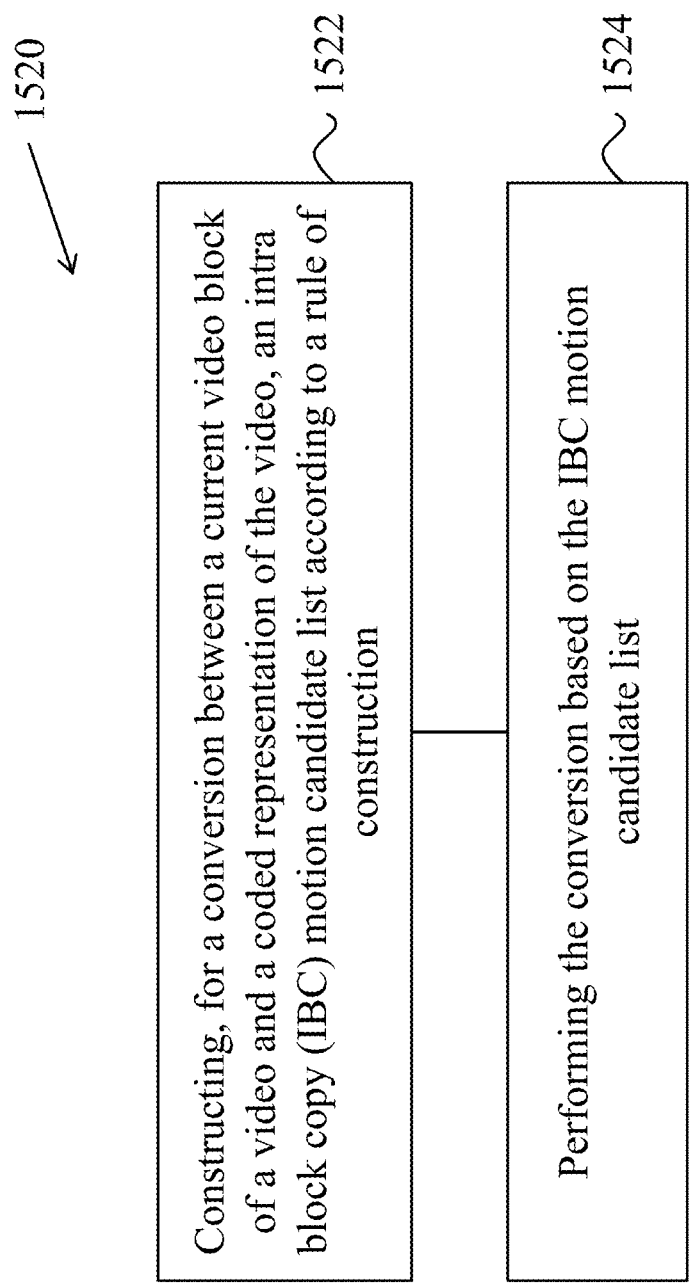

FIG. 15B shows a flowchart of an exemplary method for video processing. The method 1520 includes, at step 1522, constructing, for a conversion between a current video block of a video and a coded representation of the video, an intra block copy (IBC) motion candidate list according to a rule of construction. The method 1520 further includes, at step 1524, performing the conversion based on the IBC motion candidate list. In some implementations, the rule of construction specifies to check spatial neighboring blocks at different relative positions for addition to the IBC motion candidate list than spatial neighboring blocks that are checked for adding to a regular motion candidate list.

Figure 15C:
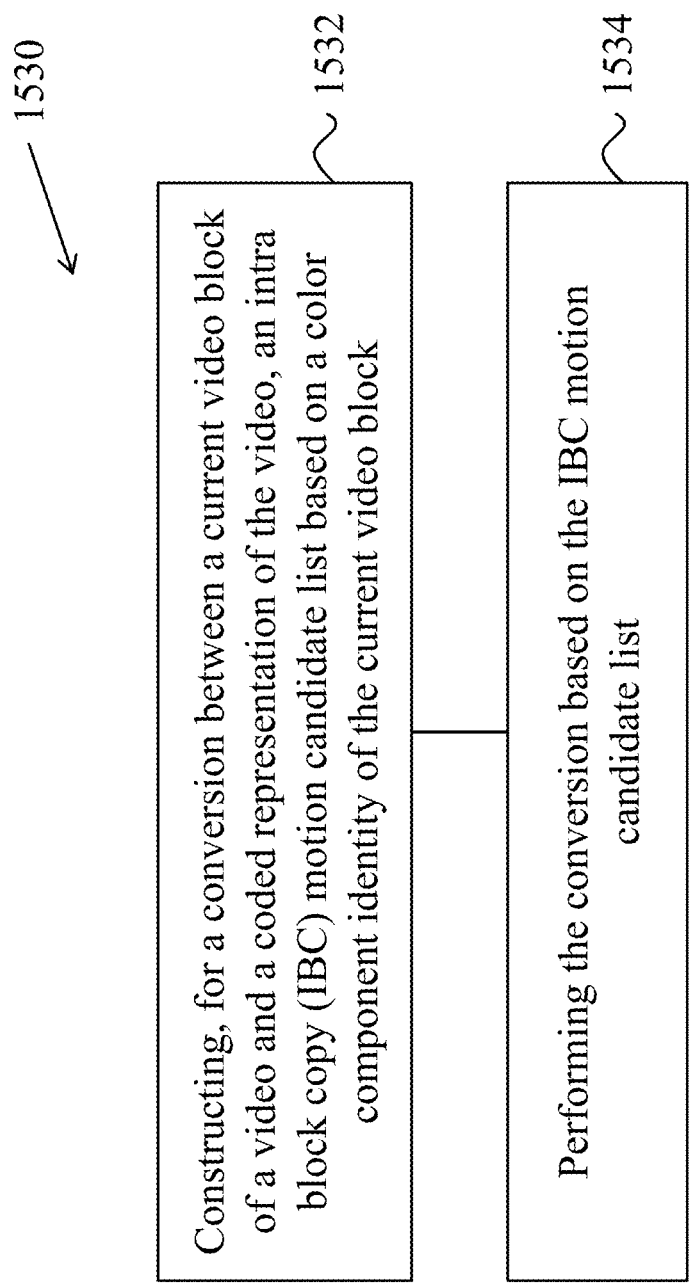

FIG. 15C shows a flowchart of an exemplary method for video processing. The method 1530 includes, at step 1532, constructing, for a conversion between a current video block of a video and a coded representation of the video, an intra block copy (IBC) motion candidate list based on a color component identity of the current video block. The method 1530 further includes, at step 1534, performing the conversion based on the IBC motion candidate list.

Figure 16A:
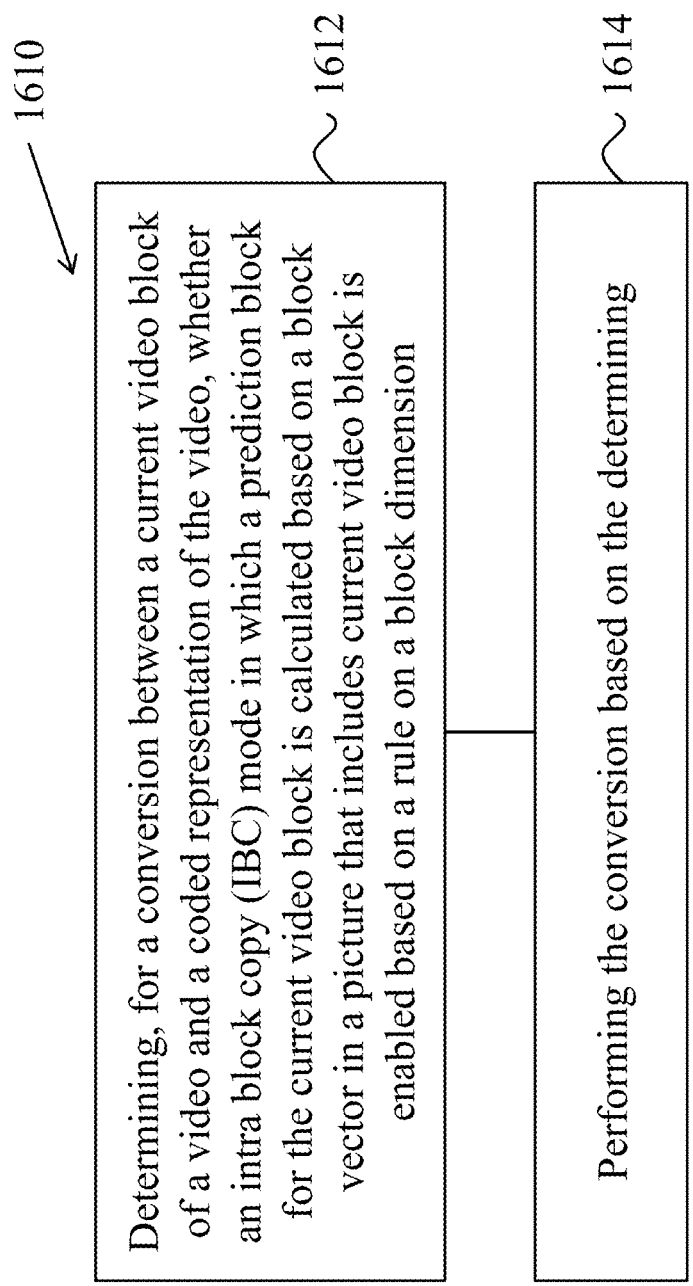
FIGS. 16A to 16C show flowcharts of example methods for video processing.

FIG. 16A shows a flowchart of an exemplary method for video processing. The method 1610 includes, at step 1612, determining, for a conversion between a current video block of a video and a coded representation of the video, whether an intra block copy (IBC) mode in which a prediction block for the current video block is calculated based on a block vector in a picture that includes current video block is enabled based on a rule on a block dimension. The method 1610 further includes, at step 1614, performing the conversion based on the determining.

Figure 16B:
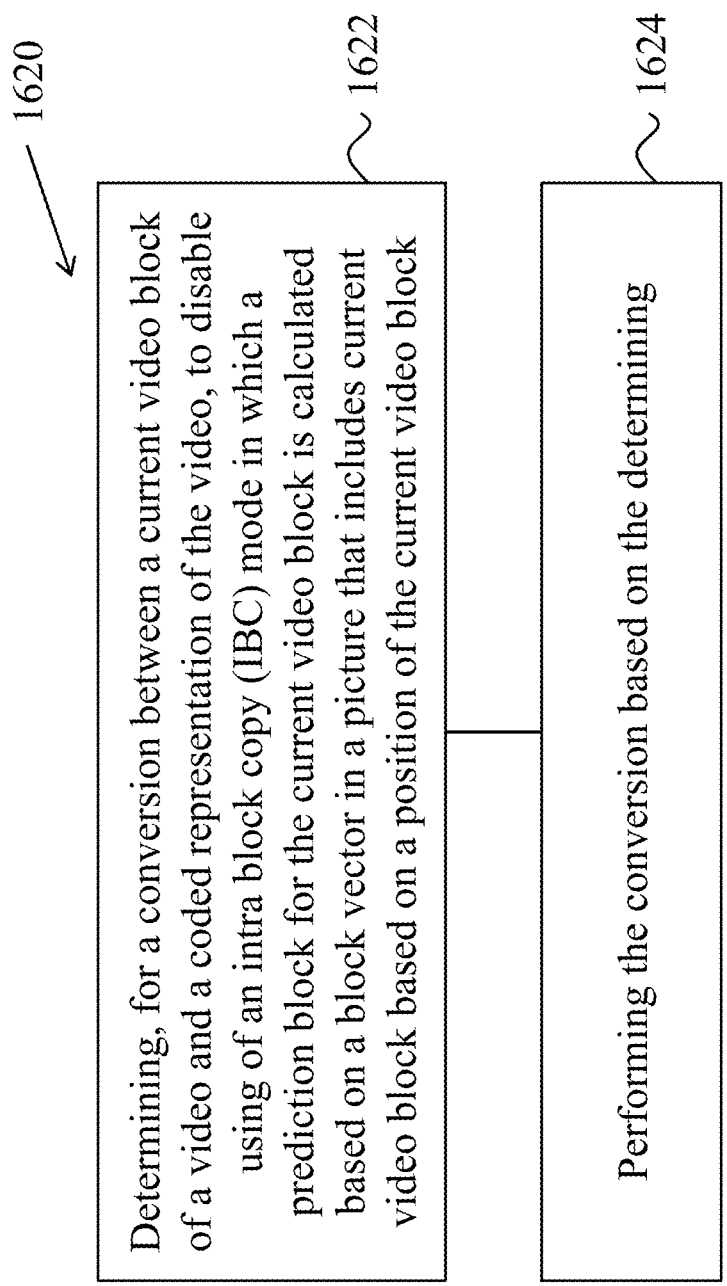

FIG. 16B shows a flowchart of an exemplary method for video processing. The method 1620 includes, at step 1622, determining, for a conversion between a current video block of a video and a coded representation of the video, to disable using of an intra block copy (IBC) mode in which a prediction block for the current video block is calculated based on a block vector in a picture that includes current video block based on a position of the current video block. The method 1620 further includes, at step 1624, performing the conversion based on the determining.

Figure 16C:
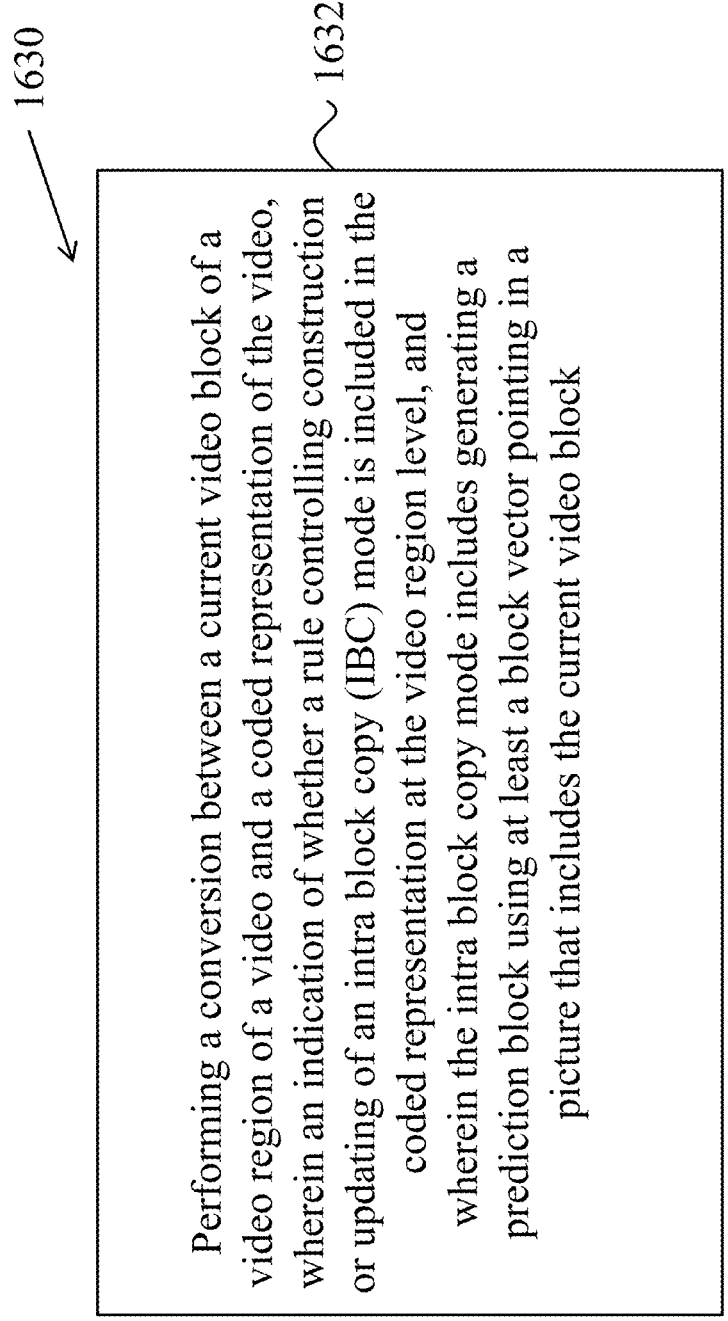

FIG. 16C shows a flowchart of an exemplary method for video processing. The method 1630 includes, at step 1632, performing a conversion between a current video block of a video region of a video and a coded representation of the video, wherein an indication of whether a rule controlling construction or updating of an intra block copy (IBC) mode is included in the coded representation at the video region level, and wherein the intra block copy mode includes generating a prediction block using at least a block vector pointing in a picture that includes the current video block.

Figure 17:
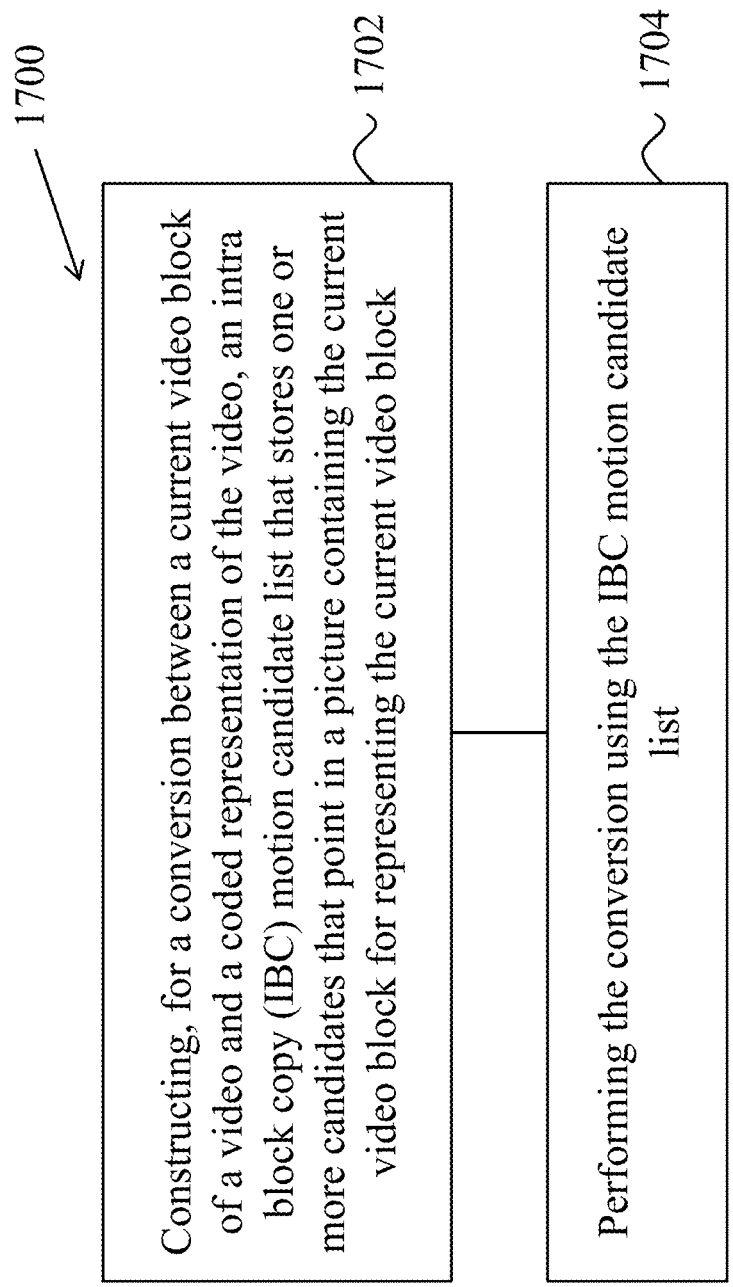
FIG. 17 shows a flowchart of an example method for video processing.

FIG. 17 shows a flowchart of an exemplary method for video processing. The method 1700 includes, at step 1702, constructing, for a conversion between a current video block of a video and a coded representation of the video, an intra block copy (IBC) motion candidate list that stores one or more candidates that point in a picture containing the current video block for representing the current video block. The method 1700 further includes, at step 1704, performing the conversion using the IBC motion candidate list. In some implementations, the coded representation includes a first field to derive a maximum size of the IBC motion candidate list and a second field, different from the first field, to derive a maximum size of a regular motion candidate list.

8. Example Implementations of the Disclosed Technology

Figure 18A:
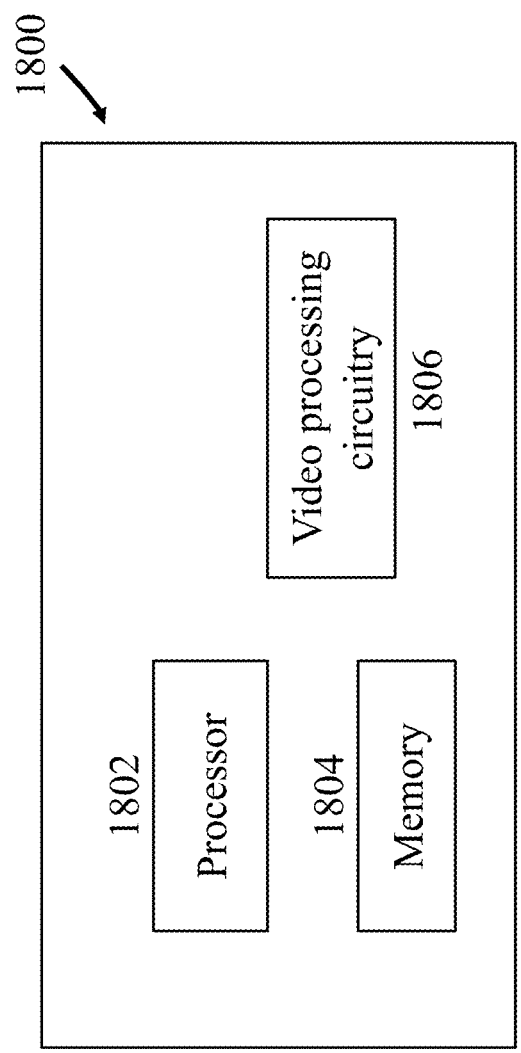
FIGS. 18A and 18B show block diagrams of examples of a hardware platform for implementing a visual media decoding or a visual media encoding technique described in the present document.

FIG. 18A is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806. The processor(s) 1802 may be configured to implement one or more methods (including, but not limited to, methods as shown in FIGS. 14A to 17) described in the present document. The memory (memories) 1804 may be used for storing data and code used for implementing the methods and techniques described herein. The video processing hardware 1506 may be used to implement, in hardware circuitry, some techniques described in the present document.

Figure 18B:
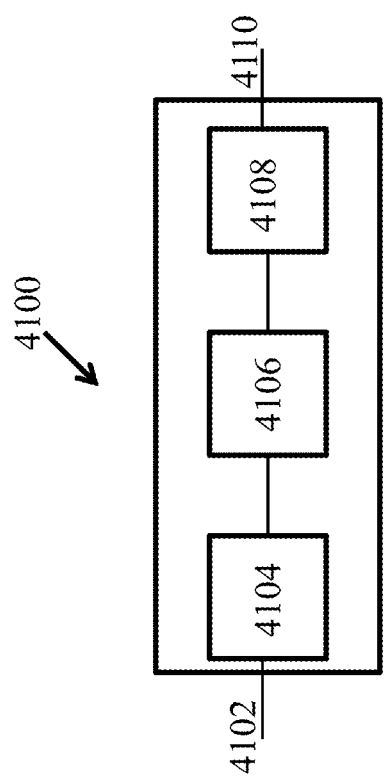

FIG. 18B is another example of a block diagram of a video processing system in which disclosed techniques may be implemented. FIG. 18B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4100 may include a coding component 4104 that may implement the various coding or encoding methods described in the present document. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video processing methods may be implemented using an apparatus that is implemented on a hardware platform as described with respect to any one of FIG. 14A to 17.

Various techniques and embodiments may be described using the following clause-based format.

The first set of clauses describe certain features and aspects of the disclosed techniques listed in the previous section, including, for example, Examples 1-3.

1. A method for video processing, comprising: performing a conversion between a current video block of a video and a coded representation of the video using an intra block copy (IBC) motion candidate list; and making a decision regarding whether to update the IBC motion candidate list by adding a motion candidate based on a condition.

2. The method of clause 1, wherein the motion candidate is not added to the IBC motion candidate list, and wherein the condition is that a reference block identified by the motion candidate overlaps the current video block.

3. The method of clause 1, wherein the motion candidate is not added to the IBC motion candidate list, and wherein the condition is that at least one sample of a reference block identified by the motion candidate is located outside a picture comprising the current video block.

4. The method of clause 1, wherein the motion candidate is not added to the IBC motion candidate list, and wherein the condition is that each sample of a reference block identified by the motion candidate is located outside a picture comprising the current video block.

5. The method of clause 1, wherein the motion candidate is not added to the IBC motion candidate list, and wherein the condition is that at least one sample of a reference block identified by the motion candidate is located outside a reconstructed area corresponding to the current video block.

6. The method of clause 1, wherein the motion candidate is not added to the IBC motion candidate list, and wherein the condition is that each sample of a reference block identified by the motion candidate is located outside a reconstructed area corresponding to the current video block.

7. The method of clause 1, wherein the motion candidate is not added to the IBC motion candidate list, and wherein the condition is that at least one sample of a reference block identified by the motion candidate is located outside of a valid area restricted by a constraint.

8. The method of clause 1, wherein the motion candidate is not added to the IBC motion candidate list, and wherein the condition is that each sample of a reference block identified by the motion candidate is located outside of a valid area restricted by a constraint.

9. The method of clause 7 or 8, wherein the constraint disallows the sample in the reference block being located in a coding tree unit (CTU) row above a CTU row comprising the current video block.

10. The method of clause 7 or 8, wherein the constraint disallows the sample in the reference block being located within the current video block.

11. The method of clause 7 or 8, wherein the constraint allows the sample in the reference block being located in a current coding tree unit (CTU) row that comprises the current video block.

12. The method of clause 7 or 8, wherein the constraint disallows the sample in the reference block being located in a coding tree unit (CTU) left of a CTU comprising the current video block.

13. The method of clause 7 or 8, wherein the constraint allows the sample in the reference block being located in a current coding tree unit (CTU) that comprises the current video block.

14. The method of clause 7 or 8, wherein the constraint allows the sample in the reference block being located in a predefined area.

15. The method of clause 14, wherein the predefined area depends on at least one of i) a position of the current video block, ii) a dimension of the current video block, iii) a position of a M×N block comprising the current video block, iv) a resolution of a picture including the current video block, or v) an encoding or decoding order of blocks within a coding tree unit (CTU) or a M×N rectangle.

16. The method of clause 14, wherein the predefined area includes at least one of i) samples in a coding tree unit (CTU) left of a CTU comprising the current video block, ii) samples in the current video block, iii) samples in a CTU above the CTU comprising the current video block.

17. The method of clause 14, wherein a video region including the current video block is split into N×M rectangles, and for a block in the current N×M rectangles, the predefined area includes at least one of i) samples in N×M rectangles that are left of the current N×M rectangles, ii) samples in N×M rectangles that are above the current N×M rectangles, or iii) samples in the current N×M rectangles.

18. The method of clause 14, wherein at least one of a coding tree unit (CTU) or N×M rectangles are split into K sub-regions, K being an integer equal to or greater than one, and wherein the predefined area depends on a position of a sub-region or/and an encoding or decoding order of the sub-region.

19. The method of clause 1, wherein the motion candidate is not added to the IBC motion candidate list, and wherein the condition is the motion candidate is a spatial candidate from a certain spatial neighboring or a non-adjacent block.

20. The method of clause 1, wherein the motion candidate is added to the IBC motion candidate list, and wherein the condition is the motion candidate is a spatial candidate from a spatial neighboring or a non-adjacent block.

21. The method of clause 1, wherein the motion candidate is not added to the IBC motion candidate list, and wherein the condition is the motion candidate is a certain history-based motion vector prediction (HMVP) candidate.

22. The method of clause 1, wherein the motion candidate is added to the IBC motion candidate list, and wherein the condition is the motion candidate is a history-based motion vector prediction (HMVP) candidate.

23. The method of clause 1, wherein the motion candidate is not added to the IBC motion candidate list, and wherein the condition is the motion candidate is a certain pairwise candidate.

24. The method of clause 1, wherein the motion candidate is added to the IBC motion candidate list, and wherein the condition is the motion candidate is a pairwise candidate.

25. The method of any of clauses 2 to 19, 21, and 23, wherein the motion candidate that are not added to the IBC motion candidate list based on the condition is designated as unavailable.

26. The method of clause 1, wherein the motion candidate is not be selected in a conformance bitstream, and wherein the condition is the motion candidate is designated as unavailable and added to the IBC motion candidate list.

27. The method of clause 1, wherein an IBC mode is not signaled in a case that all of motion candidates in the IBC motion candidate list are designated as unavailable.

28. The method of clause 1, wherein an IBC mode is signaled but not selected in a conformance bitstream in a case that all of motion candidates in the IBC motion list are designated as unavailable.

29. The method of clause 1, wherein a motion candidate that is not added to the IBC motion candidate list is used for generating a new motion candidate.

30. A method for video processing, comprising: maintaining, for a conversion between a current video block of a video and a coded representation of the video, an intra block copy (IBC) motion candidate list in which motion candidates are added according to a rule; and performing the conversion using the IBC motion candidate list.

31. The method of clause 30, wherein the motion candidates include one or more default motion candidates.

32. The method of clause 31, wherein the motion candidates include at least one of coordinate of (−W, H), (−W, 3*H/2), (−3*W/2, −H), (−3*W/2, −3*H/2), (−2*W, 0), (0, −2*H), or (−W, 0), (0, −H), W and H indicating a width and a height of the current video block.

33. The method of clause 31, wherein the one or more default motion candidates are determined based on a position of the current video block and/or a dimension of the current video block.

34. The method of clause 31, wherein an order to insert the one or more default motion candidates is based on a position of the current video block and/or a dimension of the current video block.

35. The method of clause 31, wherein the one or more default motion candidates are signaled in a video parameter set (VPS), a sequence parameter set (SPS), a picture parameter set (PPS), a picture header, a slice header or a tile group header.

36. The method of clause 30, wherein the motion candidates include one or more offset candidates that are derived by adding offsets to motion vectors of one or more selected motion candidates in the IBC motion candidate list.

37. The method of clause 36, wherein the one or more selected motion candidates comprise one or more motion candidates derived from certain spatial neighboring or non-adjacent blocks.

38. The method of clause 36, wherein the one or more selected motion candidates comprise one or more IBC history-based motion vector prediction (HMVP) candidates derived from IBC HMVP tables.

39. The method of clause 36, wherein the one or more selected motion candidates comprise one or more pairwise motion candidates.

40. The method of clause 36, wherein the one or more selected motion candidates are defined as motion e candidates that are included in the IBC motion candidate list before adding the motion candidates.

41. The method of clause 36, wherein the one or more offset candidates are obtained by at least one of i) adding N1 motion vector offsets to spatial motion candidates, ii) adding N2 motion vector offsets to HMVP motion candidates, iii) adding N3 motion vector offsets to pairwise motion candidate, or iv) adding N4 motion vector offsets to current available motion candidates, and wherein N1, N2, N3, and N4 are equal to and greater than 0.

42. The method of clause 36, wherein values of the offsets depend on at least one of i) the motion candidate, ii) a position of the current video block, iii) a dimension of the block, or iv) an order of encoding or decoding of blocks in a coding tree unit or M×N rectangle.

43. The method of clause 30, wherein the motion candidates are inserted after certain pairwise motion candidates, certain default motion candidates, certain spatial motion candidates, or certain history-based motion vector prediction (HMVP) motion candidates.

44. The method of clause 30, wherein the motion candidates are inserted into the IBC motion candidate list after all pairwise motion candidates, all default motion candidates, all spatial motion candidates or all history-based motion vector prediction (HMVP) motion candidates.

45. A method for video processing, comprising: maintaining, for a conversion between a current video block of a video and a coded representation of the video, an intra block copy (IBC) motion candidate list in which a special IBC motion candidate is added; and performing the conversion using the IBC motion candidate list, wherein the special IBC motion candidate is selected by the current video block, a prediction block of the current video block is derived based on one or more default values without using motion compensation.

46. The method of clause 45, wherein one default value is used to predict an entire block.

47. The method of clause 45, wherein the current video block is divided into one or more sub-blocks, and wherein different default values of the one or more default values are used to predict each of the one or more sub-blocks.

48. The method of clause 45, wherein the special IBC motion candidate is added to the IBC motion candidate list multiple times.

49. The method of clause 45, wherein more than one additional special IBC motion candidates are added to the IBC motion candidate list.

50. The method of clause 49, wherein multiple special IBC motion candidates correspond to different default values used for predicting the current video block.

51. The method of clause 45, wherein the special IBC motion candidate is added to the IBC motion candidate list only when the number of available candidates is smaller than a predetermined value.

52. The method of clause 45, wherein the special IBC motion candidate is added to the IBC motion candidate list until a size of the IBC motion candidate list is equal to a predetermined value.

53. The method of clause 45, wherein the special IBC motion candidate is added to the IBC motion candidate list i) after at least one inherited motion candidate, ii) after a HMVP motion candidate, iii) after a pairwise motion candidate, or v) after all other motion candidates.

54. The method of clause 45, wherein an additional motion candidate is added to the IBC motion candidate list and the special IBC motion candidate is added to the IBC motion candidate list after the additional motion candidate.

55. The method of clause 45, wherein the special IBC motion candidate is interleaved with other motion candidates.

56. The method of clause 45, wherein the one or more default values are signaled in a video parameter set (VPS), a sequence parameter set (SPS), a picture parameter set (PPS), a slice header or a tile group header.

57. The method of clause 45, wherein the one or more default values are derived at a decoder implicitly.

58. The method of clause 57, wherein the one or more default values comprises at least one of 1<<(bitDepth−1), 1<<bitDepth and 0, wherein bitDepth is a bit depth of samples of the current video block.

59. The method of clause 45, wherein the one or more default values are based on a bit depth of samples of the current video block.

60. The method of clause 45, wherein different default values of the one or more default values are used for different color components of the current video block.

61. The method of clause 45, wherein the one or more default values are derived based on previously processed video region of the video, the video region is a picture, slice, or tile.

62. The method of clause 45, wherein the one or more default values are used to derive a reconstruction block of the current video block.

63. The method of any one of clauses 1 to 62, wherein the IBC motion candidate list is an IBC merge candidate list.

64. The method of any one of clauses 1 to 62, wherein the IBC motion candidate list is an IBC AMVP candidate list.

65. The method of any of clauses 1-64, wherein the performing of the conversion includes generating the coded representation from the current block.

66. The method of any of clauses 1-64, wherein the performing of the conversion includes generating the current block from the coded representation.

67. An apparatus in a video system comprising a processor and a non-transitory memory with instructions thereon, wherein the instructions upon execution by the processor, cause the processor to implement the method in any one of clauses 1 to 66.

68. A computer program product stored on a non-transitory computer readable media, the computer program product including program code for carrying out the method in any one of clauses 1 to 66.

The second set of clauses describe certain features and aspects of the disclosed techniques listed in the previous section, including, for example, Examples 4-7, 13, and 14.

1. A video processing method, comprising: constructing, during a conversion between a current video block and a coded representation of the current video block, an intra block copy (IBC) motion candidate list, wherein insertion of motion candidates to the IBC motion candidate list is subject to a size restriction; and performing the conversion using the IBC motion candidate list.

2. The method of clause 1, wherein a motion candidate is a spatial motion candidate, and wherein at most K1 spatial motion candidates are inserted into the IBC motion candidate e list, K1 being equal to or greater than 1.

3. The method of clause 2, wherein K1 is based on MaxMrgListSizeIbc.

4. The method of clause 1, wherein a motion candidate is a history-based motion vector prediction (HMVP) motion candidate, and wherein at most K2 HMVP motion candidates are inserted into the IBC motion candidate list, K2 being equal to or greater than 0.

5. The method of clause 4, wherein K2 is based on MaxMrgListSizeIbc.

6. The method of clause 4, wherein K2 is different from a maximum number of motion candidates that is used for a regular motion candidate list that is different from the IBC motion candidate list.

7. The method of clause 1, wherein a motion candidate is a pairwise merge candidate, and wherein at most K3 pairwise motion candidates are inserted into the IBC motion candidate list, K3 being equal to or greater than 0.

8. The method of clause 7, wherein K3 is based on MaxMrgListSizeIbc.

9. The method of clause 4, wherein K3 is different from a maximum number of motion candidates that is used for a regular motion candidate list that is different from the IBC motion candidate list.

10. The method of clause 6 or 9, wherein the regular motion candidate list is a merge list of a non-IBC mode.

11. A method for video processing, comprising: constructing, for a conversion between a current video block of a video and a coded representation of the video, an intra block copy (IBC) motion candidate list according to a rule of construction; and performing the conversion based on the IBC motion candidate list, and wherein the rule of construction specifies to check spatial neighboring blocks at different relative positions for addition to the IBC motion candidate list than spatial neighboring blocks that are checked for adding to a regular motion candidate list.

12. The method of clause 11, wherein a first block located at a first relative position relative to an inter merge coded block is checked for construction of the regular motion candidate list, and a third block located at the first relative position relative to the current video block is not checked for construction of the IBC motion candidate list.

13. The method of clause 11, wherein a second block located at a second relative position relative to the current video block is checked for construction of the IBC motion candidate list, and a fourth block located at the second relative position relative to an inter merge coded block is not checked for construction of the regular motion candidate list.

14. The method of clause 11, wherein the maintaining of the IBC motion candidate list includes checking an adjacent block of the spatial neighboring block in a case that motion information of the spatial neighboring block results in a motion candidate that is not inserted into the IBC motion candidate list.

15. The method of clause 14, wherein the maintaining of the IBC motion candidate list further includes adding motion information derived from the adjacent block after all motion candidates derived from the spatial neighboring block.

16. The method of clause 11, wherein the maintaining of the IBC motion candidate list includes adding motion information of an adjacent block of the spatial neighboring block in a case that motion information of the spatial neighboring block results in a motion candidate that is not inserted into the IBC motion candidate list.

17. A method for video processing, comprising: constructing, for a conversion between a current video block of a video and a coded representation of the video, an intra block copy (IBC) motion candidate list based on a color component identity of the current video block; and performing the conversion based on the IBC motion candidate list.

18. The method of clause 17, wherein a dual-tree is used for luma and chroma components and the IBC motion candidate list is different for the luma and chroma components.

19. The method of any of clauses 1 to 18, wherein the current video block is coded with an IBC (intra block copy) AMVP (advanced motion vector prediction) mode in which an AMVP index point to an entry in the IBC AMVP list is parsed from the coded representation.

20. The method of any one of clauses 1 to 18, wherein the IBC motion candidate list is an IBC merge candidate list.

21. The method of any of clauses 1 to 20, wherein the performing of the conversion includes generating the coded representation from the current block.

22. The method of any of clauses 1 to 20, wherein the performing of the conversion includes generating the current block from the coded representation.

23. An apparatus in a video system comprising a processor and a non-transitory memory with instructions thereon, wherein the instructions upon execution by the processor, cause the processor to implement the method in any one of clauses 1 to 22.

24. A computer program product stored on a non-transitory computer readable media, the computer program product including program code for carrying out the method in any one of clauses 1 to 22.

The third set of clauses describe certain features and aspects of the disclosed techniques listed in the previous section, including, for example, Examples 8-11.

1. A method for video processing, comprising: determining, for a conversion between a current video block of a video and a coded representation of the video, whether an intra block copy (IBC) mode in which a prediction block for the current video block is calculated based on a block vector in a picture that includes current video block is enabled based on a rule on a block dimension; and performing the conversion based on the determining.

2. The method of clause 1, wherein the IBC mode is an IBC merge mode in which an index pointing to an entry in an IBC merge list is parsed from the coded representation or an IBC AMVP (advanced motion vector prediction) mode in which an AMVP index pointing to an entry in an IBC AMVP list is parsed from the coded representation.

3. The method of clause 1, wherein the determining determines that the IBC mode is not enabled for the current video block having a block size that contains less than M*H samples.

4. The method of clause 1, wherein the determining determines that the IBC mode is not enabled for the current video block having a block size that contains more than M*H samples.

5. The method of clause 1, wherein the determining determines that the IBC mode is not enabled for the current video block having a width and/or a height whose minimum size is smaller than or not greater than a predetermined value.

6. The method of clause 1, wherein the determining determines that the IBC mode is not enabled for the current video block having a width that is equal to or greater than a first predetermined value and/or a height that is equal to or greater than a second predetermined value.

7. The method of clause 1, wherein the determining determines that the IBC mode is not enabled for the current video block having a width that is greater than a first predetermined value and a height that is greater than a second predetermined value.

8. The method of clause 6 or 7, wherein the IBC mode is not enabled for the current video block that is a M×M block, N×M block, or M×N block, and wherein M is 128 and N is an integer equal to or greater than 4 or an integer equal to or greater than 64.

9. The method of clause 7, wherein the first predetermined value and the second predetermined value are both equal to 64.

10. The method of clause 1, wherein the determining determines that the IBC mode is not enabled for the current video block having a width that is equal to or smaller than a first predetermined value and/or a height that is equal to or smaller than a second predetermined value.

11. The method of clause 10, wherein the first predetermined value and the second predetermined value is 8.

12. The method of clause 10, wherein the determining determines that the IBC mode for the current video block is disabled and indications of the IBC mode for the current video block are not present in the coded representation.

13. The method of clause 10, wherein the determining determines that the IBC mode for the current video block is disabled, and parsing of indications of the IBC mode for the current video block is skipped.

14. A method for video processing, comprising: determining, for a conversion between a current video block of a video and a coded representation of the video, to disable using of an intra block copy (IBC) mode in which a prediction block for the current video block is calculated based on a block vector in a picture that includes current video block based on a position of the current video block; and performing the conversion based on the determining.

15. The method of clause 14, wherein the determining determines to disable the using of the IBC mode for a first coding unit (CU) in a coding tree unit (CTU) row or in a coding tree unit.

16. The method of clause 14, wherein the determining determines to disable the using of the IBC mode for coding units (CUs) that are located at a left boundary of a coding tree unit (CTU) row or a coding tree unit.

17. The method of any of clauses 14 to 16, wherein the determining determines to disable the using of the IBC mode and wherein an indication of the IBC mode is not sent and the IBC mode is inferred to be false.

18. A method for video processing, comprising: performing a conversion between a current video block of a video region of a video and a coded representation of the video, wherein an indication of whether a rule controlling construction or updating of an intra block copy (IBC) mode is included in the coded representation at the video region level, and wherein the intra block copy mode includes generating a prediction block using at least a block vector pointing in a picture that includes the current video block.

19. The method of clause 18, wherein the video region includes a picture parameter set (PPS), a video parameter set (VPS), a picture header, a tile group header, a sequence parameter set (SPS).

20. The method of clause 18, wherein a separate tree partition structure is applied to the current video block and the indication is signaled multiple times for the video region.

21. The method of clause 18, wherein a separate tree partition structure is applied to the current video block and the indication is signaled separately for different color components of the current video block.

22. The method of clause 18, wherein a separate tree partition structure is applied to the current video block and the indication is signaled only for one color component of the current video block.

23. The method of any of clauses 1 to 22, wherein the performing of the conversion includes generating the coded representation from the current block.

24. The method of any of clauses 1 to 22, wherein the performing of the conversion includes generating the current block from the coded representation.

25. An apparatus in a video system comprising a processor and a non-transitory memory with instructions thereon, wherein the instructions upon execution by the processor, cause the processor to implement the method in any one of clauses 1 to 24.

26. A computer program product stored on a non-transitory computer readable media, the computer program product including program code for carrying out the method in any one of clauses 1 to 24.

The fourth set of clauses describe certain features and aspects of the disclosed techniques listed in the previous section, including, for example, Examples 12.

1. A method for video processing, comprising: constructing, for a conversion between a current video block of a video and a coded representation of the video, an intra block copy (IBC) motion candidate list that stores one or more candidates that point in a picture containing the current video block for representing the current video block; and performing the conversion using the IBC motion candidate list, wherein the coded representation includes a first field to derive a maximum size of the IBC motion candidate list and a second field, different from the first field, to derive a maximum size of a regular motion candidate list.

2. The method of clause 1, wherein the maximum size of the IBC motion candidate list is different from the maximum size of the regular motion candidate list.

3. The method of clause 1, wherein the maximum size of the IBC motion candidate list is in a range between 1 and 6.

4. The method of clause 1, wherein the maximum size of the regular motion candidate list is in a range between 1 and 6.

5. The method of clause 1, wherein the maximum size of the IBC motion candidate list is signaled in a sequence parameter set (SPS), a video parameter set (VPS), a or a picture parameter set (PPS), a picture header, a tile group header, or a slice header.

6. The method of clause 1, wherein the maximum size of the IBC motion candidate list is smaller than the maximum size of the regular motion candidate list and a value of difference between the maximum size of the IBC motion candidate list and the maximum size of the regular motion candidate list is signaled in a sequence parameter set (SPS), a video parameter set (VPS), a or a picture parameter set (PPS), a picture header, a tile group header, or a slice header.

7. The method of clause 1, wherein the maximum size of the IBC motion candidate list is greater than the maximum size of the regular motion candidate list and a value of difference between the maximum size of the IBC motion candidate list and the maximum size of the regular motion candidate list is signaled in a sequence parameter set (SPS), a video parameter set (VPS), a or a picture parameter set (PPS), a picture header, a tile group header, or a slice header.

8. The method of any of clauses 1 to 7, wherein the regular motion candidate list is a merge list of a non-IBC mode.

9. The method of any of clauses 1 to 7, wherein the regular motion candidate list is a merge list of a non-IBC and non-subblock inter mode.

10. The method of any one of clauses 1 to 9, wherein the IBC motion candidate list is an IBC merge candidate list.

11. The method of any one of clauses 1 to 9, wherein the IBC motion candidate list is an IBC AMVP candidate list.

12. The method of any of clauses 1-11, wherein the performing of the conversion includes generating the coded representation from the current block.

13. The method of any of clauses 1-11, wherein the performing of the conversion includes generating the current block from the coded representation.

14. An apparatus in a video system comprising a processor and a non-transitory memory with instructions thereon, wherein the instructions upon execution by the processor, cause the processor to implement the method in any one of clauses 1 to 14.

15. A computer program product stored on a non-transitory computer readable media, the computer program product including program code for carrying out the method in any one of clauses 1 to 14.

The fifth set of clauses describe certain features and aspects of the disclosed techniques listed in the previous section.

1. A method for video processing, comprising: making a decision, during a conversion between a current video block and a bitstream representation of the current video block, regarding an insertion of a merge candidate into a IBC merge list based on a condition; and performing, based on the decision, the conversion using the IBC merge list.

2. The method of clause 1, wherein the merge candidate is not inserted into the IBC merge list, and wherein the condition is a reference block identified by the merge candidate overlaps the current video block.

3. The method of clause 1, wherein the merge candidate is not inserted into the IBC merge list, and wherein the condition is at least one sample of a reference block identified by the merge candidate being located outside a picture comprising the current video block.

4. The method of clause 1, wherein the merge candidate is not inserted into the IBC merge list, and wherein the condition is each sample of a reference block identified by the merge candidate being located outside a picture comprising the current video block.

5. The method of clause 1, wherein the merge candidate is not inserted into the IBC merge list, and wherein the condition is at least one sample of a reference block identified by the merge candidate being located outside a reconstructed area corresponding to the current video block.

6. The method of clause 1, wherein the merge candidate is not inserted into the IBC merge list, and wherein the condition is each sample of a reference block identified by the merge candidate being located outside a reconstructed area corresponding to the current video block.

7. The method of clause 1, wherein the merge candidate is not inserted into the IBC merge list, and wherein the condition is at least one sample of a reference block identified by the merge candidate being located outside of a valid area restricted by a constraint.

8. The method of clause 1, wherein the merge candidate is not inserted into the IBC merge list, and wherein the condition is each sample of a reference block identified by the merge candidate being located outside of a valid area restricted by a constraint.

9. The method of clause 7 or 8, wherein the constraint comprises a reference sample not being located in a coding tree unit (CTU) row above a CTU row comprising the current video block.

10. The method of clause 7 or 8, wherein the constraint comprises a reference sample not being located within the current video block.

11. The method of clause 7 or 8, wherein the constraint comprises a reference sample being located in a current coding tree unit (CTU) row that comprises the current video block.

12. The method of clause 7 or 8, wherein the constraint comprises a reference sample not being located in a coding tree unit (CTU) left of a CTU comprising the current video block.

13. The method of clause 7 or 8, wherein the valid area is based on a position of the current video block.

14. The method of clause 7 or 8, wherein the valid area is based on a width or a height of the current video block.

15. The method of clause 7 or 8, wherein the valid area is based on a resolution of a picture comprising the current video block.

16. The method of clause 1, wherein the merge candidate is not inserted into the IBC merge list, and wherein the condition is the merge candidate being a spatial candidate from a non-adjacent block.

17. The method of any of clauses 2 to 16, wherein the merge candidate is designated as unavailable.

18. The method of clause 1, wherein the merge candidate is inserted into the IBC merge list, and wherein the condition is the merge candidate being a spatial candidate from a non-adjacent block.

19. The method of clause 1, wherein the merge candidate is inserted into the IBC merge list, and wherein the condition is the merge candidate being a history-based motion vector prediction (HMVP) candidate.

20. The method of clause 1, wherein the merge candidate cannot be selected in a conformance bitstream, and wherein the condition is the merge candidate being designated as unavailable and inserted into the IBC merge list.

21. The method of clause 1, wherein the merge candidate is inserted into the IBC merge list, and wherein the condition is the merge candidate is a default merge candidate.

22. The method of clause 21, wherein the default merge candidate is signaled in a video parameter set (VPS), a sequence parameter set (SPS), a picture parameter set (PPS), a picture header, a slice header or a tile group header.

23. The method of clause 1, wherein the merge candidate is derived by adding an offset to a motion vector of a selected merge candidate in the IBC merge list.

24. The method of clause 23, wherein the selected merge candidate comprises one or more history-based motion vector prediction (HMVP) candidates derived from HMVP tables.

25. The method of clause 23, wherein the selected merge candidate comprises one or more pairwise merge candidates.

26. The method of clause 1, wherein the merge candidate is inserted into the IBC merge list after certain pairwise merge candidates, certain default merge candidates, certain spatial merge candidates or certain history-based motion vector prediction (HMVP) merge candidates.

27. The method of clause 1, wherein the merge candidate is inserted into the IBC merge list after all pairwise merge candidates, all default merge candidates, all spatial merge candidates or all history-based motion vector prediction (HMVP) merge candidates.

28. The method of clause 1, wherein the merge candidate is a special IBC merge candidate that is inserted into the IBC merge list, wherein one or more default values are used to derive a prediction block, and wherein motion compensation is not performed.

29. The method of clause 28, wherein the current video block is divided into one or more sub-blocks, and wherein different default values of the one or more default values are used to predict each of the one or more sub-blocks.

30. The method of clause 28, wherein the special IBC merge candidate is inserted into the IBC merge list multiple times.

31. The method of clause 28, wherein the special IBC merge candidate is inserted into the IBC merge list after at least one inherited merge candidate.

32. The method of clause 28, wherein the special IBC merge candidate is inserted into the IBC merge list before a HMVP merge candidate.

33. The method of clause 28, wherein the special IBC merge candidate is inserted into the IBC merge list before a pairwise merge candidate.

34. The method of clause 28, wherein the one or more default values are signaled in a video parameter set (VPS), a sequence parameter set (SPS), a picture parameter set (PPS), a slice header or a tile group header.

35. The method of clause 28, wherein the one or more default values are based on a bit depth of samples of the current video block.

36. The method of clause 28, wherein different default values of the one or more default values are used for each color component of the current video block.

37. The method of clause 1, wherein the merge candidate is a spatial merge candidate, and wherein at most $K1 \geq 1$ spatial merge candidates are inserted into the IBC merge list.

38. The method of clause 37, wherein K1 is based on MaxMrgListSizeIbc.

39. The method of clause 1, wherein the merge candidate is a history-based motion vector prediction (HMVP) merge candidate, and wherein at most $K2>0$ HMVP merge candidates are inserted into the IBC merge list.

40. The method of clause 39, wherein K2 is based on MaxMrgListSizeIbc.

41. The method of clause 1, wherein a maximum size of the IBC merge list is MaxMrgListSizeIbc that is different from MaxMrgListSize.

42. The method of clause 41, wherein MaxMrgListSizeIbc is signaled in a video parameter set (VPS), a sequence parameter set (SPS), a picture parameter set (PPS), a slice header or a tile group header.

43. The method of clause 41, wherein MaxMrgListSizeIbc<MaxMrgListSize, and wherein (MaxMrgListSize−MaxMrgListSizeIbc) is signaled in a slice header, a tile group header, a video parameter set (VPS), a sequence parameter set (SPS) or a picture parameter set (PPS).

44. The method of clause 41, wherein MaxMrgListSizeIbc>MaxMrgListSize, and wherein (MaxMrgListSizeIbc−MaxMrgListSize) is signaled in a slice header, a tile group header, a video parameter set (VPS), a sequence parameter set (SPS) or a picture parameter set (PPS).

45. The method of clause 1, wherein a construction of the IBC merge list is based on one or more color components of the current video block.

46. The method of any of clauses 1 to 45, wherein the conversion comprises generating pixel values of the current video block from the bitstream representation.

47. The method of any of clauses 1 to 45, wherein the conversion comprises generating the bitstream representation from the current video block.

48. An apparatus in a video system comprising a processor and a non-transitory memory with instructions thereon, wherein the instructions upon execution by the processor, cause the processor to implement the method in any one of clauses 1 to 47.

49. A computer program product stored on a non-transitory computer readable media, the computer program product including program code for carrying out the method in any one of clauses 1 to 47.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them.

Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of processing video data, comprising:
    constructing, for a first conversion between a first video block of a video and a bitstream of the video, a first motion candidate list in a first prediction mode, wherein in the first prediction mode, prediction samples are derived from blocks of sample values of a same slice as determined by block vectors, and wherein a maximum number of motion candidates in the first motion candidate list being equal to M1, and M1 being equal to or greater than 1; and
    constructing, for a second conversion between a second video block of the video and the bitstream, a second motion candidate list in an inter merge prediction mode, wherein a maximum number of motion candidates in the second motion candidate list being equal to M2, and M2 being equal to or greater than 1;
    wherein at most L1 candidates in a first history-based motion vector predictor (HMVP) candidate table are inserted into the first motion candidate list, and wherein candidates in the first HMVP candidate table are arranged based on a sequence of addition of the candidates into the first HMVP candidate table, and L1 being equal to or greater than 0,
    wherein at most L2 candidates in a second HMVP candidate table are inserted into the second motion candidate list, and wherein candidates in the second HMVP candidate table are arranged based on a sequence of addition of the candidates into the second HMVP candidate table, and L2 being equal to or greater than 0, and
    wherein in a case that M1 is equal to M2, L1 is not equal to L2.

2. The method of claim 1, wherein a first field is used to derive M1, and wherein the first field is included in the bitstream.

3. The method of claim 2, wherein the first field is signaled in a sequence parameter set (SPS).

4. The method of claim 1, L1 is derived at least based on M1.

5. The method of claim 1, wherein at most K1 block vectors of corresponding K1 spatial neighboring blocks are inserted into the first motion candidate list, and wherein K1 being equal to or greater than 1.

6. The method of claim 5, wherein K1 is derived at least based on M1.

7. The method of claim 6, wherein K1 being equal to 2 in response to M1 is greater than 1.

8. The method of claim 6, wherein K1 being equal to 1 in response to M1 being equal to 1.

9. The method of claim 1, wherein pairwise merge candidate is not inserted into the first motion candidate list.

10. The method of claim 1, wherein block vector of a first spatial neighboring block is not inserted into the first motion candidate list in a case that the block vector of the first spatial neighboring block is unavailable.

11. The method of claim 1, wherein the first motion candidate list is an intra block copy merging candidate list, and the second motion candidate list is an inter merging candidate list.

12. The method of claim 1, wherein in a case that the first video block is a first coding block of a coding tree block row based on a coding order, the first prediction mode is not applied.

13. The method of claim 1, wherein the first conversion includes encoding the first video block into the bitstream, and the second conversion includes encoding the second video block into the bitstream.

14. The method of claim 1, wherein the first conversion includes decoding the first video block from the bitstream, and the second conversion includes decoding the second video block from the bitstream.

15. An apparatus for processing video data comprising a processor and a non-transitory memory with instructions thereon, wherein the instructions upon execution by the processor, cause the processor to:

construct, for a first conversion between a first video block of a video and a bitstream of the video, a first motion candidate list in a first prediction mode, wherein in the first prediction mode, prediction samples are derived from blocks of sample values of a same slice as determined by block vectors, and wherein a maximum number of motion candidates in the first motion candidate list being equal to M1, and M1 being equal to or greater than 1; and construct, for a second conversion between a second video block of the video and the bitstream, a second motion candidate list in an inter merge prediction mode, wherein a maximum number of motion candidates in the second motion candidate list being equal to M2, and M2 being equal to or greater than 1;

wherein at most L1 candidates in a first history-based motion vector predictor (HMVP) candidate table are inserted into the first motion candidate list, and wherein candidates in the first HMVP candidate table are arranged based on a sequence of addition of the candidates into the first HMVP candidate table, and L1 being equal to or greater than 0;

wherein at most L2 candidates in a second HMVP candidate table are inserted into the second motion candidate list, and wherein candidates in the second HMVP candidate table are arranged based on a sequence of addition of the candidates into the second HMVP candidate table, and L2 being equal to or greater than 0, and wherein in a case that M1 is equal to M2, L1 is not equal to L2.

16. The apparatus of claim 15, wherein a first field is used to derive M1, and wherein the first field is included in the bitstream.

17. The apparatus of claim 16, wherein the first field is signaled in a sequence parameter set (SPS).

18. The apparatus of claim 15, L1 is derived at least based on M1.

19. A non-transitory computer-readable storage medium storing instructions that cause a processor to:

construct, for a first conversion between a first video block of a video and a bitstream of the video, a first motion candidate list in a first prediction mode, wherein in the first prediction mode, prediction samples are derived from blocks of sample values of a same slice as determined by block vectors, and wherein a maximum number of motion candidates in the first motion candidate list being equal to M1, and M1 being equal to or greater than 1; and construct, for a second conversion between a second video block of the video and the bitstream, a second motion candidate list in an inter merge prediction mode, wherein a maximum number of motion candidates in the second motion candidate list being equal to M2, and M2 being equal to or greater than 1;

wherein at most L1 candidates in a first history-based motion vector predictor (HMVP) candidate table are inserted into the first motion candidate list, and wherein candidates in the first HMVP candidate table are arranged based on a sequence of addition of the candidates into the first HMVP candidate table, and L1 being equal to or greater than 0;

wherein at most L2 candidates in a second HMVP candidate table are inserted into the second motion candidate list, and wherein candidates in the second HMVP candidate table are arranged based on a sequence of addition of the candidates into the second HMVP candidate table, and L2 being equal to or greater than 0, and wherein in a case that M1 is equal to M2, L1 is not equal to L2.

20. A non-transitory computer-readable recording medium storing a bitstream of a video which is generated by a method performed by a video processing apparatus, wherein the method comprises:

constructing, for a first conversion between a first video block of a video and a bitstream of the video, a first motion candidate list in a first prediction mode, wherein in the first prediction mode, prediction samples are derived from blocks of sample values of a same slice as determined by block vectors, and wherein a maximum number of motion candidates in the first motion candidate list being equal to M1, and M1 being equal to or greater than 1; and constructing, for a second conversion between a second video block of the video and the bitstream, a second motion candidate list in an inter merge prediction mode, wherein a maximum number of motion candidates in the second motion candidate list being equal to M2, and M2 being equal to or greater than 1;

generating the bitstream based on the first video block and the second video block;

wherein at most L1 candidates in a first history-based motion vector predictor (HMVP) candidate table are inserted into the first motion candidate list, and wherein candidates in the first HMVP candidate table are arranged based on a sequence of addition of the candidates into the first HMVP candidate table, and L1 being equal to or greater than 0;

wherein at most L2 candidates in a second HMVP candidate table are inserted into the second motion candidate list, and wherein candidates in the second HMVP candidate table are arranged based on a sequence of addition of the candidates into the second HMVP candidate table, and L2 being equal to or greater than 0, and wherein in a case that M1 is equal to M2, L1 is not equal to L2.

* * * * *